(12) United States Patent
Seok et al.

(10) Patent No.: US 11,510,181 B2
(45) Date of Patent: Nov. 22, 2022

(54) METHOD AND APPARATUS FOR ENHANCED PREAMBLE PUNCTURED PPDU IN A WIRELESS NETWORK

(71) Applicant: MEDIATEK SINGAPORE PTE. LTD., Solaris (SG)

(72) Inventors: Yongho Seok, San Jose, CA (US); Jianhan Liu, San Jose, CA (US); Chao-Chun Wang, San Jose, CA (US); James Chi-Shi Yee, San Jose, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 18 days.

(21) Appl. No.: 16/788,029

(22) Filed: Feb. 11, 2020

(65) Prior Publication Data

US 2020/0288439 A1    Sep. 10, 2020

Related U.S. Application Data

(60) Provisional application No. 62/814,905, filed on Mar. 7, 2019, provisional application No. 62/813,204, filed on Mar. 4, 2019.

(51) Int. Cl.
*H04W 72/04* (2009.01)
*H04W 74/08* (2009.01)
*H04L 1/00* (2006.01)
*H04L 5/00* (2006.01)

(52) U.S. Cl.
CPC .......... *H04W 72/04* (2013.01); *H04L 1/0013* (2013.01); *H04L 5/0053* (2013.01); *H04W 74/0816* (2013.01)

(58) Field of Classification Search
CPC .... H04L 5/0053; H04L 1/0013; H04L 1/0014
See application file for complete search history.

(56) References Cited

U.S. PATENT DOCUMENTS

| | | | |
|---|---|---|---|
| 2017/0041171 A1* | 2/2017 | Li | H04L 5/0053 |
| 2017/0181136 A1 | 6/2017 | Bharadwaj et al. | |
| 2017/0303242 A1* | 10/2017 | Choi | H04W 72/04 |
| 2019/0007180 A1* | 1/2019 | Shi | H04L 5/0051 |

(Continued)

FOREIGN PATENT DOCUMENTS

| | | |
|---|---|---|
| CN | 108432173 A1 | 8/2018 |
| TW | 201737652 A | 10/2017 |

OTHER PUBLICATIONS

Working Group of the LAN/MAN Standards Committee of the IEEE Computer Society; IEEE P802.11AX/D3.0 Draft Standard for Information technology—Telecommunications and information exchange between systems Local and metropolitan area networks—Specific requirements. Dated Jun. 1, 2018. 682 pp.

*Primary Examiner* — Raj Jain

(57) ABSTRACT

Embodiments of the present invention provide a punctured preamble enabling wireless devices to efficiently use a channel (e.g., an 80 or 160 MHz channel) where a primary service is operating. A Wideband Channel Access Mechanism for 20 MHz/80 MHz operating STAs is provided so that a 20 MHz/80 MHz operating STA can dynamically move to a secondary channel to improve wireless performance of the STA. An AP coordinates the operating channel switch of the 20 MHz/80 MHz operating STA. An EHT cooperative multi-band operation can be applied to the preamble punctured PPDU for simultaneous multi-band operation.

16 Claims, 20 Drawing Sheets

(56) References Cited

U.S. PATENT DOCUMENTS

2019/0238301 A1\* 8/2019 Verma ................... H04L 5/0046
2020/0288439 A1\* 9/2020 Seok ................. H04W 74/0816
2020/0396742 A1\* 12/2020 Park ..................... H04L 1/1614
2021/0144696 A1\* 5/2021 Cariou ................ H04L 27/2602

\* cited by examiner

METHOD AND APPARATUS FOR ENHANCED PREAMBLE PUNCTURED PPDU IN A WIRELESS NETWORK

CROSS-REFERENCE TO RELATED APPLICATIONS

This application claims the benefit of and priority to provisional patent application Ser. No. 62/814,905, with filing date Mar. 7, 2019, and provisional patent application Ser. No. 62/813,204, with filing date Mar. 4, 2019, which are both hereby incorporated by reference in their entirety.

FIELD

Embodiments of the present invention generally relate to the field of wireless communications. More specifically, embodiments of the present invention relate to systems and methods for providing punctured preambles to support legacy devices in a channel (e.g., an 80 or 160 MHz channel) where a primary service is operating.

BACKGROUND

The 2.4 GHz and 5 GHz Wi-Fi signal ranges are divided into a series of smaller channels, and Wi-Fi network equipment (e.g., a wireless access point or station) is able to communicate data using these channels. When a wireless access point (AP) is transmitting data to a wireless station (STA), different channels may be influenced by different sources of wireless interference, and the type and amount of interference may change over time. Therefore, a typical wireless AP will switch channels intermittently based on the levels of interferences or traffic detected on the current channel.

Some wireless stations are only capable of sending and receiving data using 20 MHz channel bandwidth (e.g., a "20 MHz only" device). Presently, these devices are limited to a primary 20 MHz width operating channel. However, limiting devices to operating on a primary 20 MHz width operating channel may cause poor network performance. For example, if a 20 MHz operating non-AP HE STA is the receiver of a 40 MHz, 80 MHz, 80+80 MHz or 160 MHz HE MU PPDU (Physical Layer Convergence Protocol (PLCP) Protocol Data Unit), or the transmitter of a 40 MHz, 80 MHz, 80+80 MHz or 160 MHz HE TB PPDU, then the RU tone mapping in the 20 MHz channel is not properly aligned with the 40 MHz, 80 MHz, 80+80 MHz or 160 MHz resource unit (RU) tone mapping. Because a 20 MHz operating STA can only use a primary 20 MHz channel, the performance of the 20 MHz operating STA is limited. In order for an AP to utilize an entire 80 MHz bandwidth, a 20 MHz operating STA must be capable of wideband OFDMA. OFDMA transmissions that involve 20 MHz operating STAs mixed with 80 MHz capable STAs can lead to similar performance limitations.

Similar issues are present for 80 MHz operating STAs when the 80 MHz operating STA is connected with a 160 MHz/80+80 MHz BSS. Because an 80 MHz operating STA can only use a primary 80 MHz channel, the performance of the 80 MHz operating STA is limited. In order for an AP to utilize an entire 160 MHz/80+80 MHz bandwidth, an 80 MHz operating STA must be capable of wideband Orthogonal frequency-division multiple access (OFDMA).

Overlapping basic service set (BSS) operation in a primary 80 MHz channel is not recommended for performance and efficiency considerations. Typically, if an AP or a mesh STA starts a VHT BSS that occupies some or all channels of any existing BSSs, the AP or mesh STA may select a primary channel of the new very high throughput (VHT) BSS that is identical to the primary channel of any one of the existing BSSs. If an AP or a mesh STA selects a primary channel for a new VHT BSS with a 40 MHz, 80 MHz, 160 MHz, or 80+80 MHz BSS bandwidth from among the channels on which no beacons are detected during the OBSS scans, then the selected primary channel meets the following conditions:

- It is not identical to the secondary 20 MHz channel of any existing BSSs with a 40 MHz, 80 MHz, 160 MHz, or 80+80 MHz BSS bandwidth.
- It does not overlap with the secondary 40 MHz channel of any existing BSSs with a 80 MHz, 160 MHz or 80+80 MHz BSS bandwidth.
- An STA that is an AP or mesh STA does not start a VHT BSS with a 20 MHz BSS bandwidth on a channel that is the secondary 20 MHz channel of any existing BSSs with a 40 MHz, 80 MHz, 160 MHz, or 80+80 MHz BSS bandwidth, or overlap with the secondary 40 MHz channel of any existing BSSs with a 160 MHz or 80+80 MHz BSS bandwidth.

For these reasons, an Overlapping BSS (OBSS) rarely occupies only a secondary 20 MHz channel or only a secondary 40 MHz channel. On the other hand, an OBSS will frequently occupy a 20 MHz channel of a secondary 80 MHz channel. However, in this case, the performance of 160/80+80 MHz, 240/80+80+80 MHz, 320/80+80+80+80 MHz channels is reduced. Moreover, U-NII Mid and U-NII Worldwide bands in 5 GHz are subject to the Dynamic Frequency Selection, and bands in 6 GHz also may have some constraint such as Dynamic Frequency Selection.

Moreover, the occupied bandwidth of a primary service (such as Terminal Doppler Weather Radar (TDWR)) is less than 20 MHz (e.g., Radar bandwidth is a few megahertz). However, the usual operating bandwidth of 802.11ac and 802.11ax BSS is 80 MHz. When 802.11ac BSS or 802.11ax BSS operate in 80 MHz channel where a primary service exists, the BSS is limited to a 20 MHz BSS or a 40 MHz BSS to protect the primary service. Therefore, one common approach is to switch the BSS's operating channel to another 80 MHz channel instead of reducing the BSS's bandwidth from 80 MHz to either 40 MHz or 20 MHz. As a result, the efficiency of an 80 MHz channel operating a primary service is relatively low.

Therefore, what is needed is a mechanism to efficiently use a channel (e.g., an 80 or 160 MHz channel) where a primary service is operating.

SUMMARY

Accordingly, embodiments of the present invention provide a punctured preamble PPDU enabling wireless devices to efficiently use a channel (e.g., an 80 or 160 MHz channel) where a primary service is operating. A Wideband Channel Access Mechanism for 20 MHz/80 MHz operating STAs is provided so that a 20 MHz/80 MHz operating STA can dynamically move to a secondary channel to improve wireless performance of the STA. An AP coordinates the operating channel switch of the 20 MHz/80 MHz operating STA. An EHT cooperative multi-band operation can be applied to the preamble punctured PPDU for simultaneous multi-band operation.

According to one embodiment, a method of wireless communication using a preamble punctured Physical Layer Convergence Protocol (PLCP) Protocol Data Unit (PPDU) is disclosed. The method includes puncturing a 20 MHz channel of an 80 MHz channel, encoding an indication of the punctured 20 MHz channel in a fixed-length SIG field, and transmitting the fixed-length SIG field in a preamble punctured PPDU on a primary 20 MHz channel of the 80 MHz channel.

According to some embodiments, the 80 MHz channel includes the primary 20 MHz channel, a 20 MHz secondary channel, and a 40 MHz secondary channel, and the puncturing includes puncturing the 20 MHz secondary channel.

According to some embodiments, the 80 MHz channel includes the primary 20 MHz channel, a 20 MHz secondary channel, 40 MHz left secondary channel, and a 40 MHz right secondary channel, and the puncturing includes puncturing the 40 MHz left secondary channel.

According to some embodiments, a bandwidth field of the preamble punctured PPDU includes a value of 4.

According to some embodiments, a bandwidth field of the preamble punctured PPDU includes a value of 5.

According to some embodiments, the method includes performing an MU-RTS Trigger/CTS frame exchange.

According to some embodiments, performing an MU-RTS Trigger/CTS frame exchange includes soliciting simultaneous CTS frame responses from a plurality of wireless STAs.

According to some embodiments, an MU-RTS Trigger frame of the MU-RTS Trigger/CTS frame exchange includes a Disallowed Subchannel Bitmap in a User Info field indicating disallowed 20 MHz subchannels and disallowed 242-tone RUs.

According to some embodiments, an AID12 subfield of the MU-RTS Trigger frame is set to a value of 2047.

According to a different embodiment, a method of wireless communication using a preamble punctured Physical Layer Convergence Protocol (PLCP) Protocol Data Unit (PPDU) is disclosed. The method includes puncturing a 20 MHz channel of a 160 MHz channel, encoding an indication of the punctured 20 MHz channel in a fixed-length SIG field, and transmitting the fixed-length SIG field in a preamble punctured PPDU on both a primary channel and a secondary channel of the 160 MHz channel.

According to some embodiments, the 160 MHz channel includes an 80+80 MHz channel.

According to some embodiments, a bandwidth field of the preamble punctured PPDU includes a value of 6 indicating that a secondary 20 MHz channel of a primary 80 MHz channel is punctured.

According to some embodiments, a bandwidth field of the preamble punctured PPDU includes a value of 7 indicating that a primary 40 MHz channel of a primary 80 MHz channel is punctured.

According to some embodiments, one, two, or three 20 MHz channels of a secondary 80 MHz channel are punctured.

According to another embodiment, a method of wireless communication using a preamble punctured Physical Layer Convergence Protocol (PLCP) Protocol Data Unit (PPDU) for EHT cooperative multi-band operation is disclosed. The method includes puncturing a 20 MHz channel of a first wireless channel, encoding an indication of the punctured 20 MHz channel in a fixed-length SIG field, and transmitting the fixed-length SIG field in a preamble punctured PPDU on the first wireless channel to a wireless station (STA), the preamble punctured PPDU includes one or more PSDUs for the wireless STA in a first resource unit (RU) for the first wireless channel and a second RU for a second channel, and the wireless STA is configured for simultaneous data transmission and reception on the first wireless channel and the second wireless channel.

According to some embodiments, the method includes the wireless STA performing a cooperative multi-band operation using the first wireless channel and the second wireless channel simultaneously.

According to some embodiments, the wireless STA includes two transceivers for performing a cooperative multi-band operation.

According to some embodiments, the two transceivers include a 2.4 GHz transceiver and a 5 GHz transceiver.

According to some embodiments, the two transceivers include a 5 GHz transceiver and a 6 GHz transceiver.

According to some embodiments, the method includes performing an MU-RTS Trigger/CTS frame exchange.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
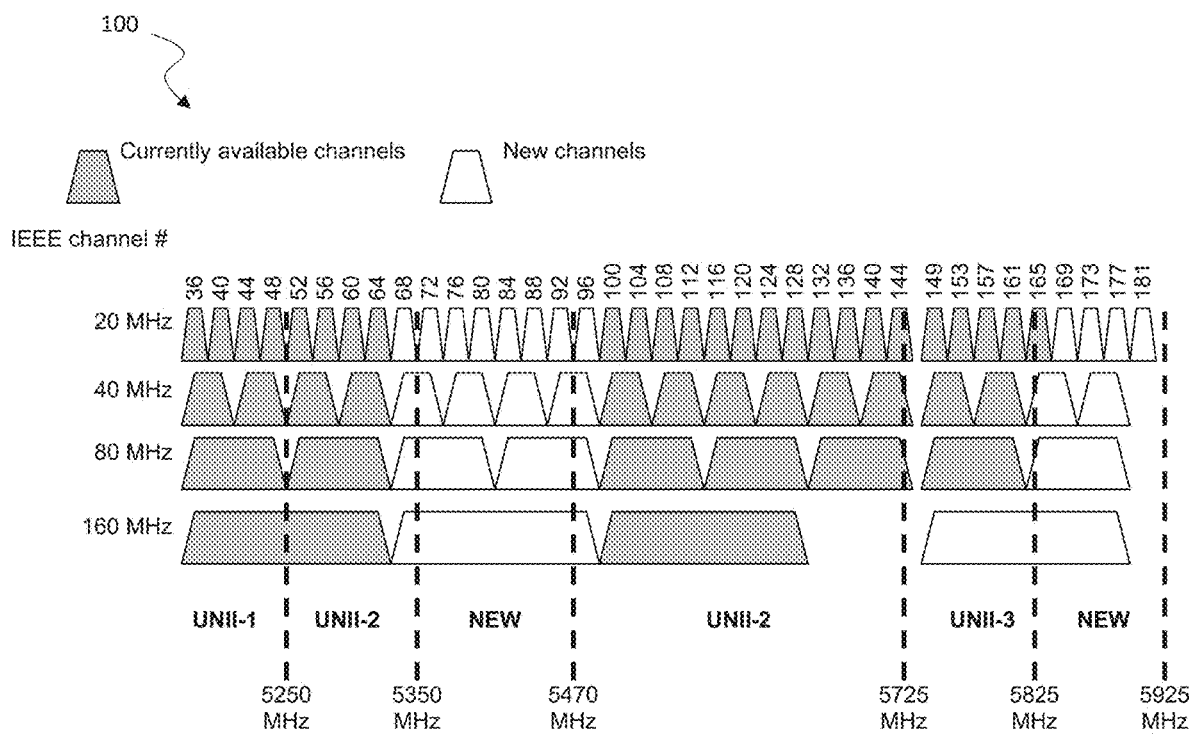
FIG. 1 is a diagram depicting the available wireless channels of the 5 GHz wireless spectrum.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 17A, 17B, and 18) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Enhanced Preamble Punctured PPDU

As used herein, the term "EHT" refers to a recent generation of wireless communication (Wi-Fi) known as Extremely High Throughput (EHT) and is defined according to the IEEE 802.11be standards. The term station (STA) may refer to an electronic device capable of sending and receiving data over Wi-Fi that is not operating as an access point (AP).

Embodiments of the present invention provide a punctured preamble enabling wireless devices to efficiently use a channel (e.g., an 80 or 160 MHz channel) where a primary service is operating. A Wideband Channel Access Mechanism for 20 MHz/80 MHz operating STAs is provided so that a 20 MHz/80 MHz operating STA can dynamically move to a secondary channel to improve wireless performance of the STA. An AP coordinates the operating channel switch of the 20 MHz/80 MHz operating STA. An EHT cooperative multi-band operation can be applied to the preamble punctured PPDU for simultaneous multi-band operation.

Figure 2:
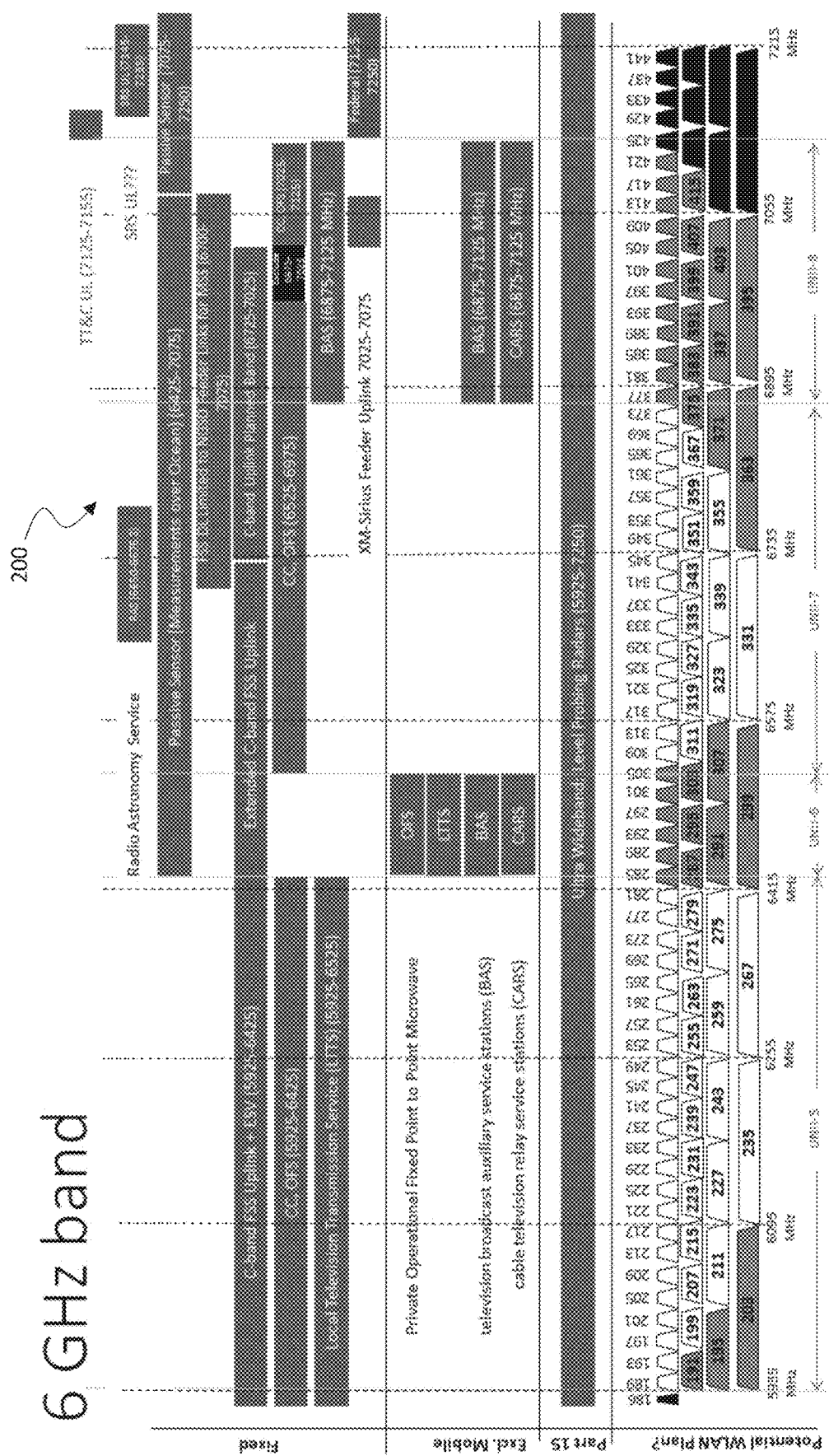
FIG. 2 is a diagram depicting the available wireless channels of the 6 GHz wireless spectrum.
Figure 3:
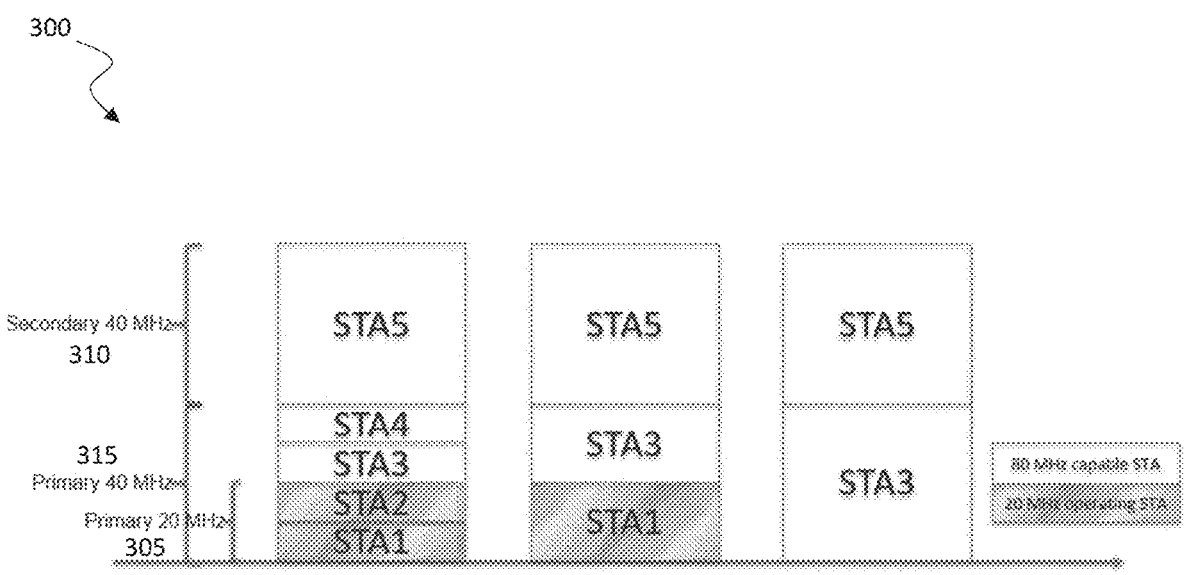
FIG. 3 is an exemplary transmission timing diagram depicting an AP performing OFDMA transmissions to serve a plurality of STAs according to embodiments of the present invention.

As depicted in FIGS. 1 and 2, new spectrums/channels are becoming available for 5 GHz and 6 GHz wireless communication. FIG. 1 depicts an exemplary spectrum 100 for 5 GHz communication, and FIG. 2 depicts an exemplary spectrum 200 for 6 GHz communication. Post-AX technology includes mechanisms to efficiently use the new channels available for 6 GHz communication. For example, for Multi-80 MHz BSS Operation, the following modes are available in the 6 GHz spectrum:

Contiguous 160 MHz or non-contiguous 80+80 MHz
Contiguous 240 MHz or non-contiguous 80+80+80 MHz
Contiguous 320 MHz or non-contiguous 80+80+80+80 MHz FIG. 3 depicts an exemplary transmission timing diagram 300 depicting an AP performing OFDMA transmissions to serve a plurality of STAs according to embodiments of the present invention. Some of the STAs are 20 MHz-only STAs, and some of the STAs are 80 MHz capable STAs. As depicted in FIG. 3, the 20-MHz only STAs (STA1 and STA2) operate on the primary 20 MHz channel 305. The 80 MHz capable STAs operate on the secondary 40 MHz channel 310 and can share the primary 40 MHz channel 315 with the 20 MHz-only STAs. In order for an AP to utilize an entire 80 MHz bandwidth, a 20 MHz operating STA is required to participate in a wideband OFDMA. Similarly, in order for an AP to utilize an entire 160 MHz/80+80 MHz bandwidth, a 80 MHz operating STA is required to participate in a wideband OFDMA.

20 MHz-only non-AP STAs are subject to several specific restrictions for assigning RUs to 20 MHz-only non-AP STAs. If a 20 MHz operating non-AP HE STA is the receiver of a 40 MHz, 80 MHz, 80+80 MHz or 160 MHz HE MU PPDU, or the transmitter of a 40 MHz, 80 MHz, 80+80 MHz or 160 MHz HE TB PPDU, then the RU tone mapping of the 20 MHz channel will not be aligned with the 40 MHz, 80 MHz, 80+80 MHz or 160 MHz RU tone mapping. Therefore, an AP shall not assign 26-tone RU 5 and 14 of a 40 MHz HE MU PPDU and HE TB PPDU to a 20 MHz operating non-AP HE STA. Moreover, an AP shall not assign the following RUs to a 20 MHz operating non-AP HE STA:

26-tone RU 5, 10, 14, 19, 24, 28 and 33 of an 80 MHz HE MU PPDU and HE TB PPDU
26-tone RU 5, 10, 14, 19, 24, 28 and 33 of the lower 80 MHz of an 80+80 MHz and 160 MHz HE MU PPDU and HE TB PPDU
26-tone RU 5, 10, 14, 19, 24, 28 and 33 of the upper 80 MHz of an 80+80 MHz HE MU PPDU and HE TB PPDU Non-AP HE STA capable of up to 80 MHz channel width are also subject to restrictions for allocating RUs to 80 MHz capable non-AP STAs. For example, when operating with 80 MHz channel width, the STA should indicate support for reception of 160 MHz or 80+80 MHz HE MU PPDU, or the transmission of 160 MHz or 80+80 MHz HE TB PPDU in the 160/80+80 MHz HE PPDU subfield in a HE PHY Capabilities Information field in an HE Capabilities element. Moreover, an HE AP STA does not allocate RUs outside of the primary 80 MHz when allocating an RU in an 160 MHz or 80+80 MHz HE MU PPDU or HE TB PPDU to a non-AP HE STA that sets the value of the 160/80+80 MHz HE PPDU subfield in the HE PHY Capabilities Information field in the HE Capabilities element to 1 when operating in 80 MHz channel width mode.

Figure 4:
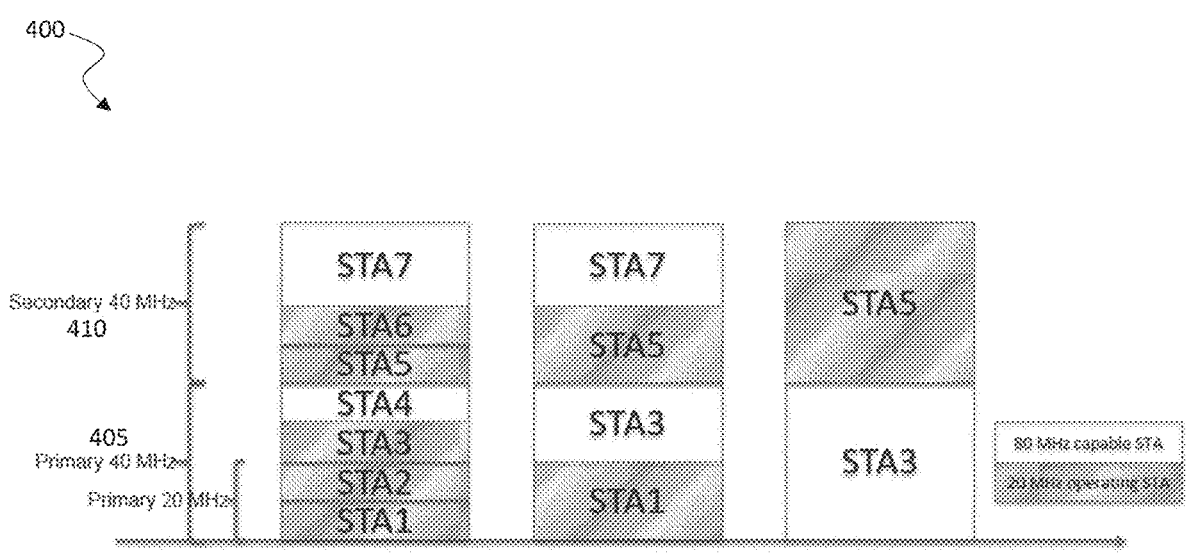
FIG. 4 is a transmission timing diagram depicting an exemplary Wideband Channel Access Mechanism for a 20 MHz/80 MHz operating STA where the 20 MHz/80 MHz operating STA can dynamically move to a secondary channel according to embodiments of the present invention.

FIG. 4 is a transmission timing diagram 400 depicting an exemplary Wideband Channel Access Mechanism for a 20 MHz/80 MHz operating STA where the 20 MHz/80 MHz operating STA can dynamically move to a secondary channel according to embodiments of the present invention. An AP coordinates the operating channel switch of the 20 MHz/80 MHz operating STA. As depicted in FIG. 4, the 80 MHz capable STAs can share the primary and secondary 40 MHz channels with the 20 MHz-only STAs. In a first example, 20 MHz only STAs STA1, STA2, and STA3 operate on the primary 40 MHz channel 405, and 20 MHz only STAs STA5 and STAG operate on the secondary 40 MHz channel 410. 80 MHz capable STAs STA4 and STAT operate on the primary and secondary 40 MHz channels 405/410, respectively, and share the primary and secondary 40 MHz channels 405/410 with the 20 MHz-only STAs.

For HE subchannel selective transmission (SST), an HE SST STA may set up SST operation by negotiating a trigger-enabled TWT as defined in 26.8.2 (Individual Time-to-wait (TWT) agreements) except that:

The TWT request may have a TWT Channel field with up to one bit set to 1 to indicate which of the secondary channels is requested to contain the RU allocations addressed to the HE SST STA that is a 20 MHz operating STA.
The TWT request may have a TWT Channel field with all the four LSBs or all the four MSBs set to 1 to indicate whether the primary 80 MHz channel or the secondary 80 MHz channel is requested to contain the RU allocations addressed to the HE SST STA that is an 80 MHz operating STA.
The TWT response has a TWT Channel field with up to one bit set to 1 to indicate which of the secondary channels will contain the RU allocations addressed to the HE SST STA that is a 20 MHz operating STA.
The TWT response has a TWT Channel field with all the 4 LSBs or all the 4 MSBs to indicate whether the primary 80 MHz channel or the secondary 80 MHz channel.

An HE SST STA that successfully sets up SST operation follows the rules defined in 26.8.2 (Individual TWT agreements) to exchange frames with the HE SST STA during negotiated trigger-enabled TWT SPs, except that the AP ensures that:

The RUs allocated in DL MU PPDUs and in Trigger frames addressed to the SST STA are within the subchannel indicated in the TWT Channel field of the TWT response and follow the RU restriction rules defined in 27.3.2.8 (RU restrictions for 20 MHz operation) if the SST STA is a 20 MHz operating STA.
The trigger-enabled TWT SPs do not overlap with TBTTs at which DTIM Beacon frames are sent.
The same subchannel is used for all trigger-enabled TWT SPs that overlap in time.

The HE SST STA follows the rules defined in 26.8.2 (Individual TWT agreements) to exchange frames with the HE SST AP during negotiated trigger-enabled TWT SPs, except that the STA:

Is available in the subchannel indicated in the TWT Channel field of the TWT response at TWT start times.
Does not access the medium in the subchannel using DCF or EDCAF.
Does not respond to Trigger frames addressed to it (see 26.5 (MU operation) and 26.8.2 (Individual TWT agreements)) unless it has performed CCA until a frame is detected by which it can set its NAV (Network Allocation Vector), or until a period equal to NAVSyncDelay has transpired (whichever is earlier).

Updates its NAV according to 26.2.4 (Updating two NAVs) if it receives a PPDU in the sub-channel.

In some cases an HE SST AP may need to change its operating channel width. For example, when an HE SST AP operating in the DFS band detects a radar signal, the HE SST AP switches its operating channel or reduces its operating channel width for avoiding the detected Dynamic Frequency Selection (DFS) signal. In this case, the HE SST AP can change its operating channel without individually terminating TWT agreements associated with all HE SST STAs.

An HE Selective Subchannel Transmission (SST) AP may transmit a Channel Switch Announcement frame or Extended Channel Switch Announcement frame to switch its operating channel or transmit an Operating Mode Notification frame and Operating Mode Notification element. When the HE SST AP's operating channels are changed to the channels that do not cover the negotiated secondary channel, the trigger-enabled TWT SPs associated the negotiated secondary channel are automatically terminated. When an HE SST STA detects (by receiving a Channel Switch Announcement frame, an Extended Channel Switch Announcement frame, an Operating Mode Notification frame, or an Operating Mode Notification element) that the HE SST AP is unable to serve the negotiated trigger-enabled TWT SPs (because the HE SST AP's operating channels do not cover the negotiated secondary channel), the HE SST STA also terminates the negotiated trigger-enabled TWT operation. The STA is not required to be available in the subchannel indicated in the TWT Channel field of the TWT response at TWT start times.

An HE SST STA may include a Channel Switch Timing element in Association/Re-Association Request frames transmitted to an SST AP to indicate the time required by the STA to switch between different subchannels. The received channel switch time informs the SST AP of the duration of time that the SST STA may not be available to receive frames before the TWT start time and after the end of the trigger-enabled TWT SP. An HE SST STA in PS mode is not required to move to the primary channel after the end of the trigger-enabled TWT SP.

As discussed in more detail below, the MU-RTS Trigger/CTS frame exchange procedure allows an AP to initiate a TXOP and protect the TXOP frame exchanges. An AP may transmit an MU-RTS Trigger frame to solicit simultaneous CTS frame responses from one or more non-AP STAs. For example, for each 20 MHz channel occupied by an PPDU that contains an MU-RTS Trigger frame, the transmitter of the MU-RTS Trigger frame requests at least one non-AP STA to send a CTS frame response that occupies the 20 MHz channel. The transmitter of an MU-RTS Trigger frame does not request the non-AP STA to send a CTS frame response in a 20 MHz channel that is not occupied by the PPDU that contains the MU-RTS Trigger frame.

After transmitting an MU-RTS Trigger frame, the AP waits for a CTSTimeout interval of aSIFSTime+aSlotTime+aRxPHYStartDelay that begins when the MAC receives the PHY-TXEND.confirm primitive for the transmitted MU-RTS Trigger frame. If the MAC does not receive a PHY-RXSTART.indication primitive during the CTSTimeout interval, the AP determines that the transmission of the MU-RTS Trigger frame has failed. If the MU-RTS Trigger frame initiated a TXOP, the AP invokes its back-off procedure. If the MAC receives a PHY-RXSTART.indication primitive during the CTSTimeout interval, the MAC waits for the corresponding PHY-RXEND.indication primitive to determine whether the MU-RTS Trigger frame transmission was successful. The receipt of a CTS frame from any non-AP STA addressed by the MU-RTS Trigger frame before the PHY-RXEND.indication primitive is considered a successful transmission of the MU-RTS Trigger frame, thereby permitting the frame exchange sequence to continue. The receipt of any other type of frame is interpreted as a failure of the MU-RTS Trigger frame transmission. Therefore, the AP may process the received frame and, if the MU-RTS Trigger frame initiated a TXOP, invoke its back-off procedure at the PHY-RXEND.indication primitive.

If a non-AP STA receives an MU-RTS Trigger frame, the non-AP STA commences the transmission of a CTS frame response at the SIFS time boundary after the end of a received PPDU when all the following conditions are met:
1. The MU-RTS Trigger frame has one of the User Info fields addressed to the non-AP STA. The User Info field is addressed to a non-AP STA if the AID12 subfield is equal to the 12 LSBs of the AID of the STA and the MU-RTS Trigger frame is sent by the AP with which the non-AP STA is associated or by the AP corresponding to the transmitted BSSID (if the non-AP STA is associated with a non-transmitted BSSID) and has indicated support for receiving Control frames with TA field set to the transmitted BSSID by setting the Rx Control Frame To MultiBSS subfield to 1 in the HE Capabilities element that the non-AP STA transmits.
2. The UL MU CS condition indicates that the medium is idle (see 26.5.3.5 (UL MU CS mechanism)).

Otherwise, the non-AP STA does not send a CTS frame response. The RU Allocation subfield in the User Info field addressed to the non-AP STA indicates whether the CTS frame response is to be sent on the primary 20 MHz channel, primary 40 MHz channel, primary 80 MHz channel, 160 MHz channel, or 80+80 MHz channel as described in 9.3.1.22.5 (MU-RTS variant).

The ED-based CCA performed during the SIFS (after receiving an MU-RTS Trigger frame) and virtual CS functions are used to determine the state of the medium for responding to an MU-RTS Trigger frame. The CTS frame sent in response to an MU-RTS Trigger frame is carried in a non-HT or non-HT duplicate PPDU with a 6 Mb/s rate and with the TXVECTOR parameter SCRAMBLER_INITIAL_VALUE to the same value as the RXVECTOR parameter SCRAMBLER_INITIAL_VALUE of the PPDU carrying the MU-RTS Trigger frame. The PPDU carrying the CTS frame is transmitted on the 20 MHz channels indicated in the RU Allocation subfield of the User Info field of the MU-RTS Trigger frame. Because the CTS frame response to an MU-RTS Trigger frame is sent on the primary 20 MHz channel, primary 40 MHz channel, primary 80 MHz channel, 160 MHz channel, or 80+80 MHz channel, the MU-RTS/CTS protection mechanism cannot be utilized by an HE SST STA. For example, when an HE SST STA that is a 20 MHz/80 MHz operation STA negotiated trigger-enabled TWT SPs on a secondary 20 MHz/40 MHz/80 MHz channel, the HE SST STA does not send the CTS frame on the primary 20 MHz/40 MHz/80 MHz channel during the corresponding TWT SPs.

According to some embodiments, an AP can transmit an MU-RTS Trigger frame to solicit simultaneous CTS frame responses from one or more non-AP STAs. The RU Allocation subfield in the User Info field addressed to the non-AP STA indicates whether the CTS frame response is to be sent on the primary 20 MHz channel, primary 40 MHz channel, primary 80 MHz channel, 160 MHz channel, or 80+80 MHz channel as described in 9.3.1.22.5 (MU-RTS variant). If the MU-RTS Trigger frame is sent to an HE SST STA during the HE SST STA's negotiated trigger-enabled TWT SPs, the RU Allocation subfield in the User Info field addressed to the HE SST STA indicates whether the CTS frame response should be sent on the negotiated secondary channel (e.g., the subchannel indicated in the TWT Channel field of the TWT response). When the HE SST STA is a 20 MHz operating STA, the CTS frame response is sent on either a secondary 20 MHz channel or one of two 20 MHz channels of the secondary 40 MHz channel (as indicated in the TWT Channel field of the TWT response). When the HE SST STA is an 80 MHz operating STA, the CTS frame response is sent on the secondary 80 MHz channel (as indicated in the TWT Channel field of the TWT response). When the User Info field in the MU-RTS Trigger frame is addressed to the HE SST STA, the RU Allocation subfield in the User Info field indicates whether the CTS frame is transmitted on the negotiated secondary channel.

B0 of the RU Allocation subfield is set to a value of 0 to indicate that the negotiated secondary channel is within the primary 80 MHz channel. B0 of the RU Allocation subfield is set to a value of 1 to indicate that the negotiated secondary channel is within the secondary 80 MHz channel. B7-B1 of the RU Allocation subfield is set to indicate the negotiated secondary channel of 20 MHz bandwidth as follows:
- 61 if the negotiated secondary channel is the lowest frequency 20 MHz channel in the primary 40 MHz or 80 MHz channel or 80 MHz segment of 80+80/160 MHz (if present)
- 62 if the negotiated secondary channel is the second lowest frequency 20 MHz channel in the primary 40 MHz or 80 MHz or 80 MHz segment of 80+80/160 MHz (if present)
- 63 if the negotiated secondary channel is the third lowest frequency 20 MHz channel in the primary 80 MHz or 80 MHz segment of 80+80/160 MHz (if present)
- 64 if the negotiated secondary channel is the fourth lowest frequency 20 MHz channel in the primary 80 MHz or 80 MHz segment of 80+80/160 MHz (if present)
- B7-B1 of the RU Allocation subfield is set to 67 to indicate the negotiated secondary channel of 80 MHz bandwidth if the negotiated secondary channel is 80 MHz segment of 80+80/160 MHz.

When B7-B1 is set to 61-64 for an HE SST STA that is a 20 MHz operation STA, B0 can be set to either 0 (the primary 80 MHz channel) or 1 (the secondary 80 MHz channel); however, when B7-B1 is set to 67 for an HE SST STA that is a 80 MHz operation STA, B0 is set to 1 (the secondary 80 MHz channel).

When the MU-RTS Trigger frame is sent to an HE SST STA during the HE SST STA's negotiated trigger-enabled TWT SPs, the AP solicits simultaneous CTS frame responses from one or more non-AP STAs on:
- The primary 40 MHz channel, if the HE SST STA's negotiated secondary channel is the secondary 20 MHz channel.
- The primary 80 MHz channel, if the HE SST STA's negotiated secondary channel is one of 20 MHz channels of the secondary 40 MHz channel.
- The 160 MHz/80+80 MHz channel, if the HE SST STA's negotiated secondary channel is the secondary 80 MHz channel.

Preamble Punctured PPDU

To improve the efficiency and performance of an 80 MHz channel operating a primary service, modes for communicating data wirelessly using preamble punctured PPDUs are provided by embodiments of the present invention. Preamble puncturing enables an 802.11ax AP to transmit a "punctured" 80 MHZ channel or 160 MHz channel when some of the secondary channels are presently in use by legacy devices. Specifically, 20 MHz subchannels can be punctured to allow a legacy system to operate in the punctured channel. Preamble puncturing allows an AP to transmit an HE MU PPDU in a punctured 80 or 160 (80+80) MHz format when part of the 20 MHz sub-channel(s) in secondary channels of the channel bandwidth is (are) busy. An 80 MHz or 160 MHz band is punctured on secondary channels but not on the primary channel.

Figure 5A:
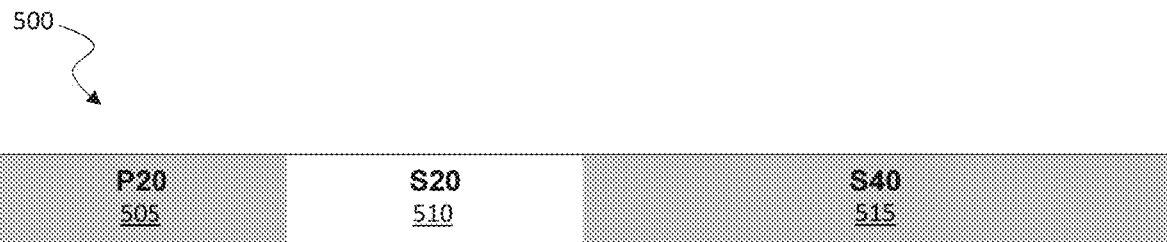
FIG. 5A is a transmission timing diagram depicting a mode (Mode 1) for wireless communication in an 80 MHz band using a punctured preamble according to embodiments of the present invention.

Several modes for implementing punctured preambles when transmitting an HE MU PPDU are described herein according to embodiments of the present invention. FIG. 5A is a transmission timing diagram 500 depicting a mode (Mode 1) for wireless communication in an 80 MHz band using a punctured preamble according to embodiments of the present invention. In Mode 1, an 80 MHz wireless band is divided into a primary 20 MHz channel 505, a secondary 20 MHz channel 510, and a secondary 40 MHz channel 515. The secondary 20 MHz channel 510 is punctured to be made available to legacy systems and devices to operate in the punctured channel.

Figure 5B:
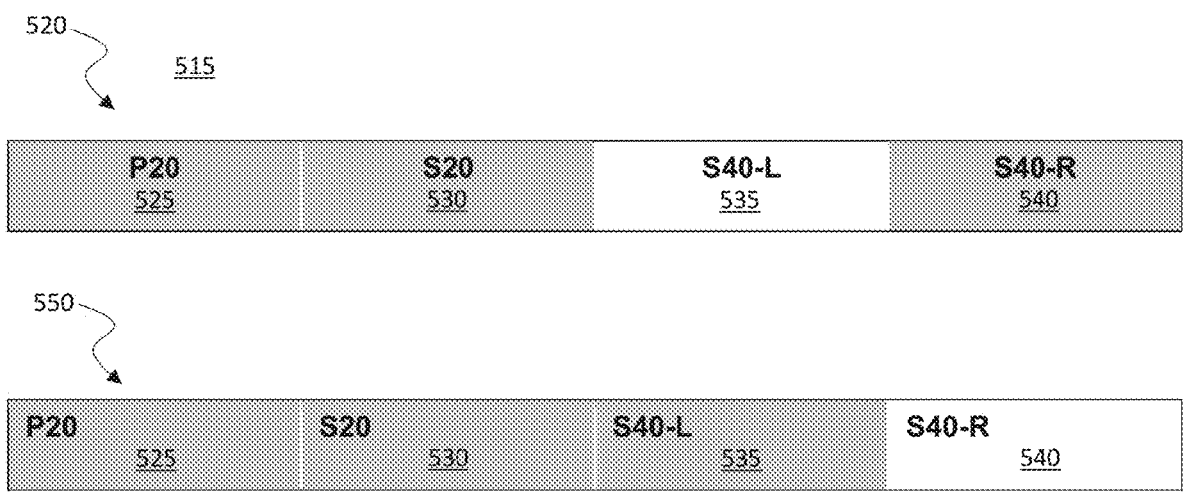
FIG. 5B shows transmission timing diagrams depicting a mode (Mode 2) for wireless communication in an 80 MHz band using a punctured preamble according to embodiments of the present invention.

FIG. 5B shows transmission timing diagrams 520 and 550 depicting a mode (Mode 2) for wireless communication in an 80 MHz band using a punctured preamble according to embodiments of the present invention. In Mode 2, the 80 MHz band is divided into a primary 20 MHz channel (P20) 525, a secondary 20 MHz channel (S20) 530, and a secondary 40 MHz channel (S40) that is subdivided into a left 20 MHz channel (S40-L) 535 and a right 20 MHz channel (S40-R) 540. Either left 20 MHz channel (S40-L) 535 or right 20 MHz channel (S40-R) 540 of secondary 40 MHz channel (S40) is punctured to be made available to legacy systems and devices to operate in the punctured channel. In transmission timing diagram 520, left 20 MHz channel (S40-L) 535 is punctured. In transmission timing diagram 5500, right 20 MHz channel (S40-R) 540 is punctured.

Figure 6A:
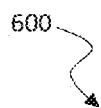
FIG. 6A is a transmission timing diagram depicting a mode (Mode 3) for wireless communication in a 160 MHz band using a punctured preamble according to embodiments of the present invention.
Figure 6A:
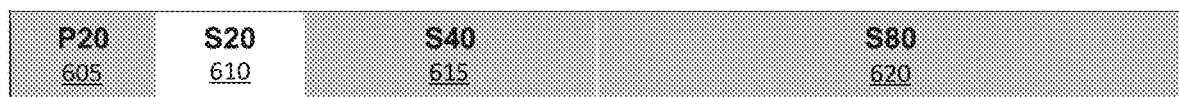

FIG. 6A is a transmission timing diagram 600 depicting a mode (Mode 3) for wireless communication in a 160 MHz band using a punctured preamble according to embodiments of the present invention. In Mode 3, the 160 MHz band is divided into a primary 20 MHz channel (P20) 605, a secondary 20 MHz channel (S20) 610, a secondary 40 MHz channel (S40) 615, and a secondary 80 MHz channel 620. In Mode 3, the secondary 20 MHz channel (S20) 610 is punctured to be made available to legacy systems and devices to operate in the punctured channel.

Figure 6B:
FIG. 6B depicts transmission timing diagrams of a mode (Mode 4) for wireless communication in a 160 MHz band using a punctured preamble according to embodiments of the present invention.
Figure 6B:
Figure 6B:
Figure 6B:
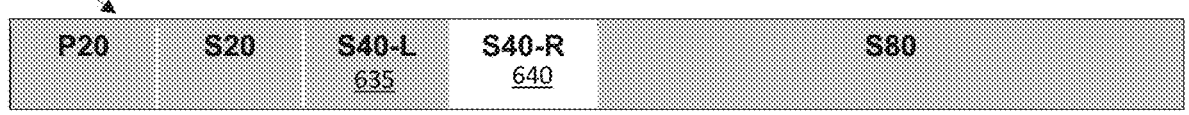
Figure 6B:
Figure 6B:
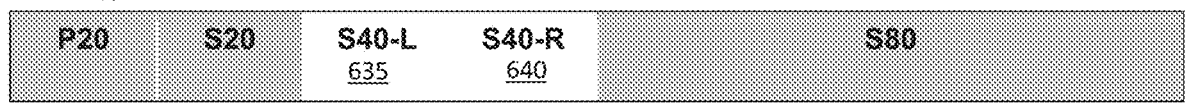

FIG. 6B depicts transmission timing diagrams 630, 650, and 670 of a mode (Mode 4) for wireless communication in a 160 MHz band using a punctured preamble according to embodiments of the present invention. In Mode 4, the secondary 40 MHz band (S40) is divided into a left 40 MHz channel (S40-L) 635 and a right 40 MHz channel (S40-R) 640. The left 40 MHz channel (S40-L) 635 and/or the right 40 MHz channel (S40-R) 640 is/are punctured to be made available to legacy systems and devices to operate in the punctured channel or channels. Specifically, in transmission timing diagram 630, left 40 MHz channel (S40-L) 635 is punctured; in transmission timing diagram 650, right 40 MHz channel (S40-R) 640 is punctured; and in transmission timing diagram 670, both the left 40 MHz channel (S40-L) 635 and the right 40 MHz channel (S40-R) 640 are punctured.

Figure 7:
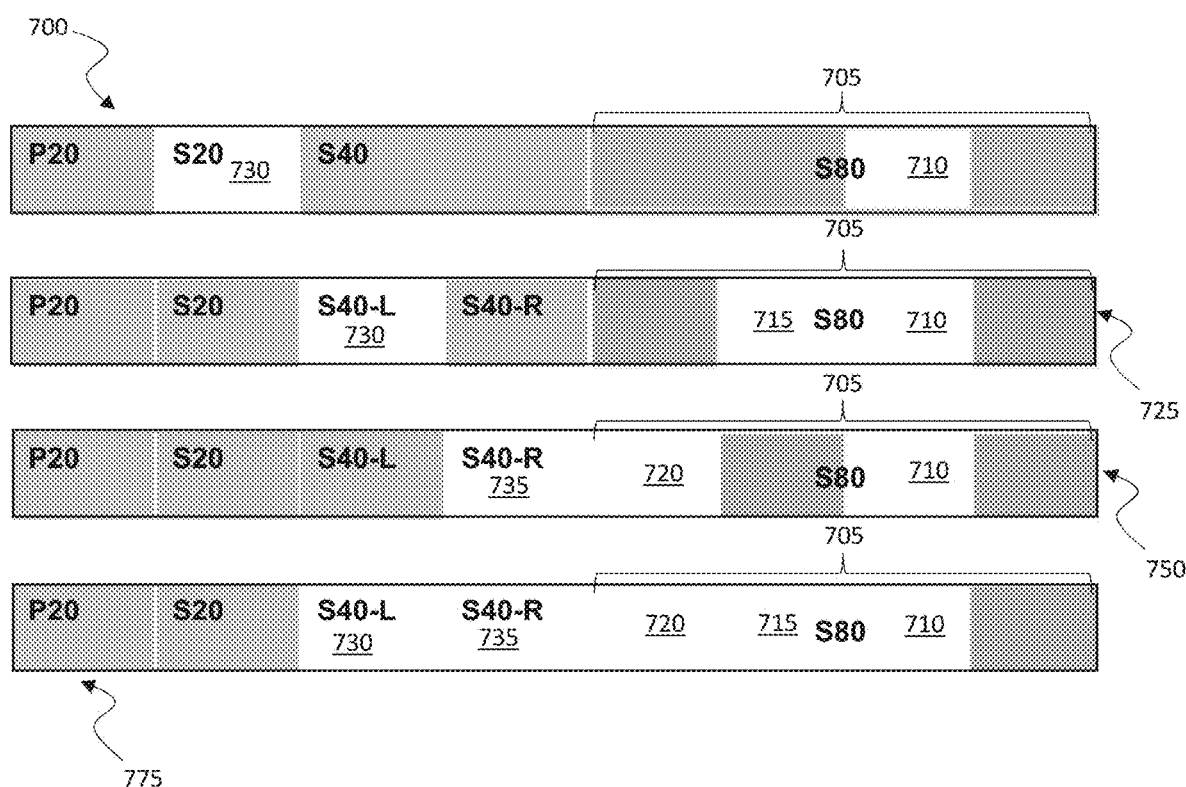
FIG. 7 depicts transmission timing diagrams of a mode (Mode 4) for wireless communication in a 160 MHz band using an alternative punctured preamble according to embodiments of the present invention.

Alternatively, according to embodiments of the present invention, Mode 3 and Mode 4 can be used to puncture one, two, or three 20 MHz channels of secondary 80 MHz channel (S80). FIG. 7 depicts transmission timing diagrams 700, 725, 750, and 775 of a mode (Mode 4) for wireless communication in a 160 MHz band using a punctured preamble according to embodiments of the present invention. As depicted in transmission timing diagram 700, the secondary 80 MHz channel (S80) 705 is punctured by a single 20 MHz channel 710. A 20 MHz secondary channel (S20) 730 is also punctured. As depicted in transmission timing diagram 725, the secondary 80 MHz channel (S80) 705 is punctured by two 20 MHz channels 710 and 715. 40 MHz left secondary channel (S40-L) 730 is also punctured. As depicted in transmission timing diagram 750, the secondary 80 MHz channel (S80) 705 is punctured by two 20 MHz channels 710 and 720. 40 MHz right secondary channel (S40-R) 735 is also punctured. As depicted in transmission timing diagram 775, the secondary 80 MHz channel (S80) 705 is punctured by three 20 MHz channels 710, 715, and 720. Both 40 MHz left secondary channel (S40-L) 730 and 40 MHz right secondary channel (S40-R) 735 are also punctured.

Mode indication in a preamble punctured PPDU is encoded in a common and fixed-length SIG field that is transmitted on the primary 20 MHz channel. Specifically, the bandwidth field of an HE-SIG-A field in an HE PPDU is set to 0 for 20 MHz, 1 for 40 MHz, 2 for 80 MHz non-preamble puncturing mode, 3 for 160 MHz and 80+80 MHz non-preamble puncturing mode, 4 for preamble puncturing in 80 MHz, where in the preamble only the secondary 20 MHz is punctured (Mode 1), 5 for preamble puncturing in 80 MHz, where in the preamble only one of the two 20 MHz sub-channels in secondary 40 MHz is punctured (Mode 2), 6 for preamble puncturing in 160 MHz or 80+80 MHz, where in the primary 80 MHz of the preamble only the secondary 20 MHz is punctured (Mode 3), or 7 for preamble puncturing in 160 MHz or 80+80 MHz, where the primary 40 MHz channel of the primary 80 MHz of the preamble is punctured (Mode 4).

In Mode 3 and Mode 4, when one, two, or three 20 MHz channels of secondary 80 MHz channel are punctured, an indication of the punctured 20 MHz channels of the secondary 80 MHz channel in a preamble punctured PPDU can be encoded in a user-specific and variable-length SIG field (e.g., HE-SIG-B in an HE PPDU) that is transmitted on the primary and secondary channels.

MU-RTS and CTS Mechanism For Punctured Preamble PPDUs

Figure 8:
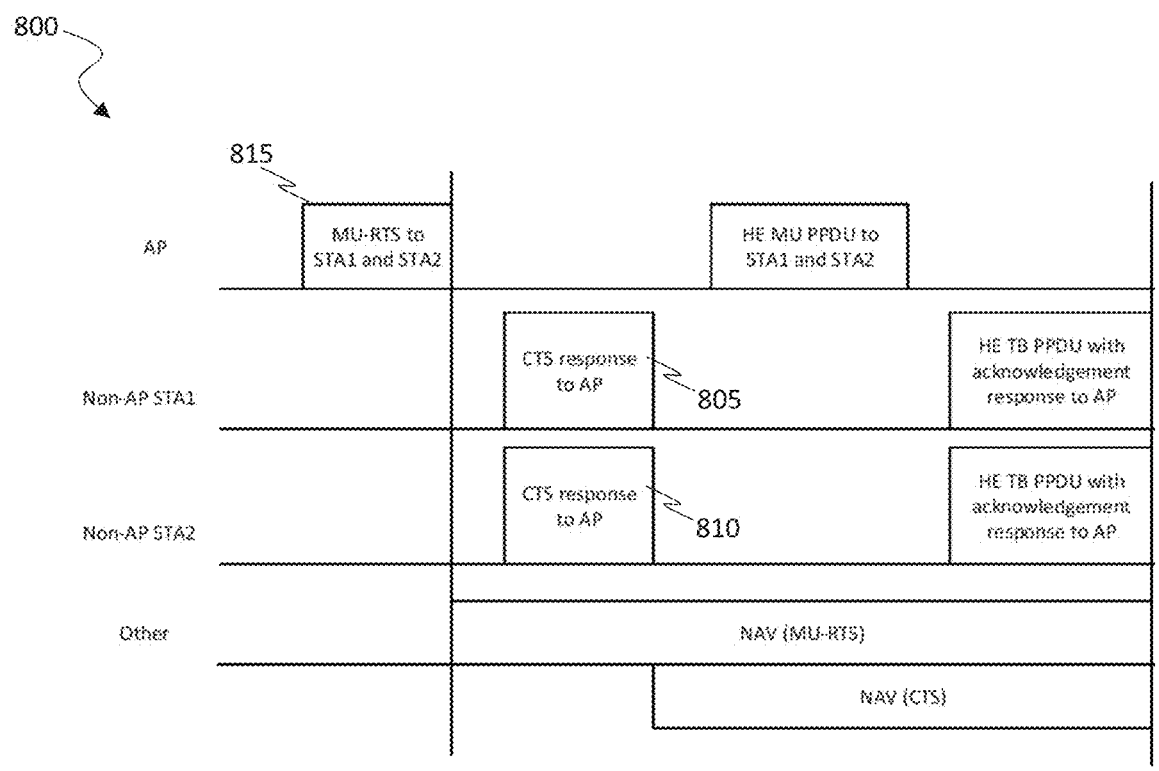
FIG. 8 is a transmission timing diagram depicting an exemplary MU-RTS Trigger/CTS frame exchange according to embodiments of the present invention.

An MU Request to Send (RTS) Trigger/Clear to Send (CTS) frame exchange procedure allows an AP to initiate a Transmission Opportunity (TXOP) and protect the TXOP frame exchanges. An AP may transmit an MU-RTS Trigger frame to solicit simultaneous CTS frame responses from one or more non-AP STAs. FIG. 8 is a transmission timing diagram 800 depicting an exemplary MU-RTS Trigger/CTS frame exchange according to embodiments of the present invention. In each 20 MHz channel occupied by the PPDU that contains an MU-RTS Trigger frame, the transmitter of the MU-RTS Trigger frame shall request at least one non-AP STA to send a CTS frame response 805 and 810 that occupies the 20 MHz channel. The transmitter of an MU-RTS Trigger frame 815 shall not request a non-AP STA to send a CTS frame response in a 20 MHz channel that is not occupied by the PPDU that contains the MU-RTS Trigger frame 815.

Figure 9:
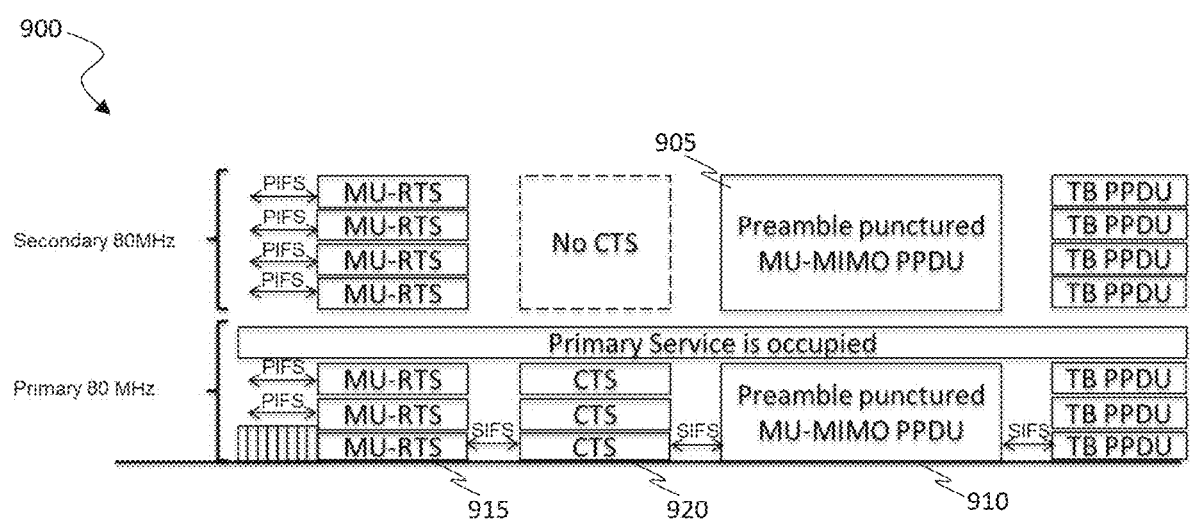
FIG. 9 is a transmission timing diagram depicting an exemplary MU-RTS Trigger/CTS frame exchange for preamble punctured PPDUs according to embodiments of the present invention.

FIG. 9 is a transmission timing diagram 900 depicting an exemplary MU-RTS Trigger/CTS frame exchange for preamble punctured PPDUs according to embodiments of the present invention. Because the CTS frame response to an MU-RTS Trigger frame is sent on the primary 20 MHz channel, primary 40 MHz channel, primary 80 MHz channel, 160 MHz channel, or 80+80 MHz channel, the MU-RTS/CTS cannot provide full protection for all channels on which preamble punctured PPDUs 905 and 910 are sent. Therefore, to improve the protection of preamble punctured PPDUs 905 and 910, an AP can transmit an MU-RTS Trigger frame 915 to solicit simultaneous CTS frame responses (e.g., CTS frame response 920) from one or more non-AP STAs.

Figure 10:
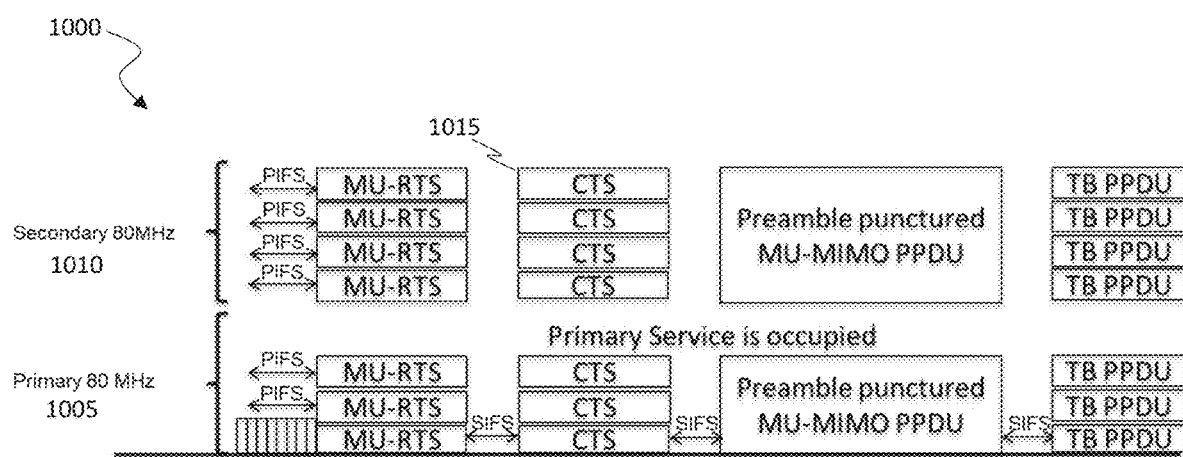
FIG. 10 is a transmission timing diagram depicting an exemplary MU-RTS Trigger/CTS frame exchange for indicating a disallowed subchannel for an STA using preamble punctured PPDUs according to embodiments of the present invention.

FIG. 10 is a transmission timing diagram 1000 depicting an exemplary MU-RTS Trigger/CTS frame exchange for indicating a disallowed subchannel for an STA using preamble punctured PPDUs according to embodiments of the present invention. The RU Allocation subfield in the User Info field addressed to the non-AP STA indicates whether the CTS frame response is to be sent on the primary 20 MHz channel, primary 40 MHz channel, primary 80 MHz channel, 160 MHz channel, or 80+80 MHz channel as described in 9.3.1.22.5 (MU-RTS variant). If the MU-RTS Trigger frame is sent in a non-HT duplicate PPDU with preamble puncturing, the MU-RTS Trigger frame includes a Disallowed Subchannel Bitmap in the User Info field where the AID12 subfield is set to a value of 2047. The Disallowed Subchannel Bitmap indicates which 20 MHz subchannels and which 242-tone RUs are disallowed in the CTS frame response 1015. Accordingly, as depicted in FIG. 10, the AP can indicate that the upper 20 MHz channel of the secondary 40 MHz channel is a disallowed subchannel, and the STA responds with the CTS frame 1015 on channels excluding the disallowed subchannel indicated by the AP in response to the AP soliciting CTS responses on the primary 80 MHz 1005 channel and the secondary 80 MHz channel 1010. The CTS frame 1015 is sent in a non-HT duplicate PPDU with a punctured preamble.

EHT Cooperative Multi-Band Operation

The approach to performing wireless communication using punctured preamble PPDUs described herein according to embodiment of the present invention can also support EHT cooperative multi-band operation. For example, EHT cooperative multi-band operation can be applied to a preamble punctured PPDU when one or more resource units in the EHT Preamble Punctured PPDU is addressed to single STA.

Figure 11:
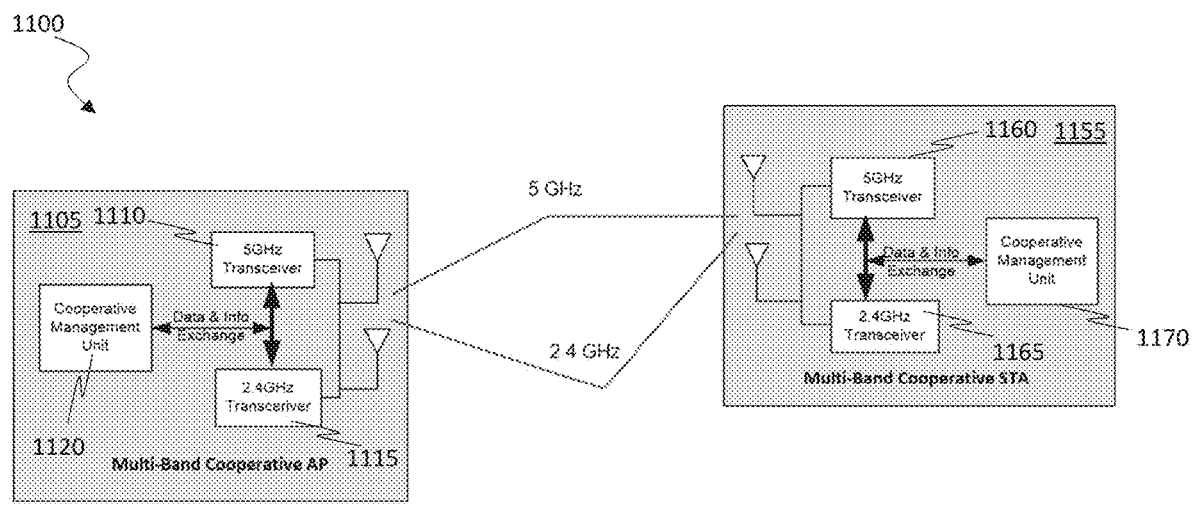
FIG. 11 is a block diagram of an exemplary wireless communication system including a multi-band cooperative AP and a multi-band cooperative STA depicted according to embodiments of the present invention.

With regard to FIG. 11, an exemplary wireless communication system 1100 including a multi-band cooperative AP 105 and a multi-band cooperative STA 1155 are depicted according to embodiments of the present invention. The multi-band cooperative AP 1105 includes a 5 GHz transceiver 1110 and a 2.4 GHz transceiver 1115. Other types of transceivers that operate on different bands, such as 6 GHz and above, can also be used by the multi-band cooperative AP 1105 according to embodiments of the present invention. The transceivers 1110 and 1115 of AP 1105 exchange data and information with cooperative management unit 1120 that coordinates information sent and/or received by transceivers 1110 and 1115. The multi-band cooperative STA 1155 includes a 5 GHz transceiver 1160 and a 2.4 GHz transceiver 1165. Other types of transceivers that operate on different bands, such as 6 GHz and above, can also be used by the multi-band cooperative STA 1155 according to some embodiments of the present invention. The transceivers 1160 and 1165 of STA 155 exchange data and information with cooperative management unit 1170 that coordinates information sent and received by transceivers 1160 and 1165 using 5 GHz band wireless communication and 2.4 GHz band wireless communication, respectively.

The multi-band cooperative AP 1105 and the multi-band cooperative STA 1155 have simultaneous transmission and reception capability for communicating using different wireless bands. The transmitters operating on the different bands can perform independent clear channel assessments (CCAs) using joint or independent transmissions. Moreover, full duplex communication can be enabled by independent multi-band operation using FDD mode. The STA 1155 can access channels in multiple bands independently. For example, after receiving an enhanced distributed channel access (EDCA) transmission opportunity (TXOP) frame, the STA 1155 can begin transmitting frames over the respective band during the window of time provided in the EDCA TXOP frame. When the STA 1155 receives EDCA TXOP frames in multiple bands simultaneously, the STA 1155 can transmit frames using multiple bands simultaneously during the provided window of time.

Figure 12:
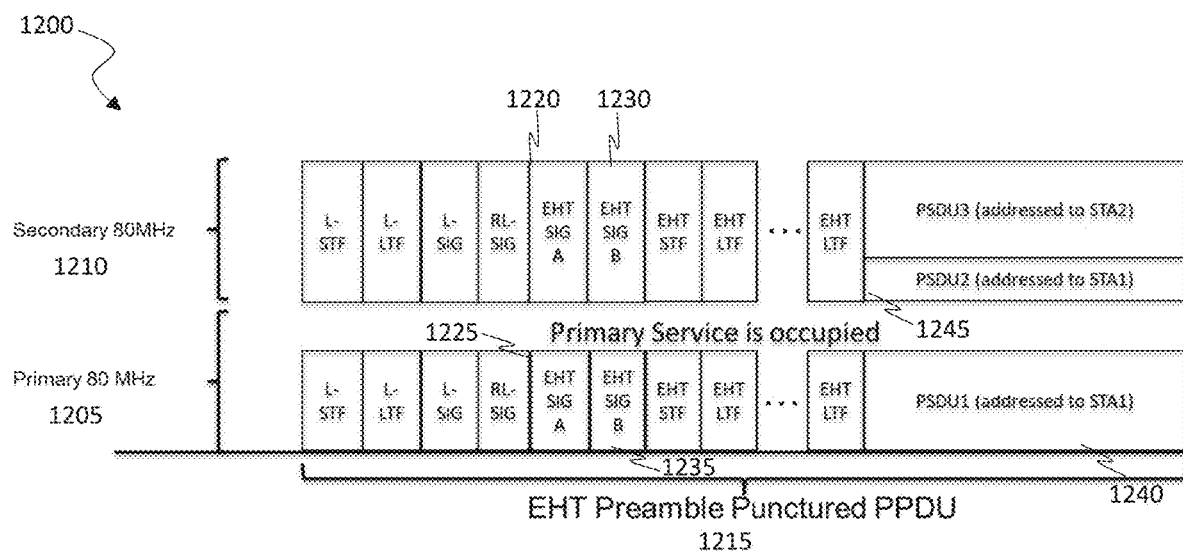
FIG. 12 is a transmission timing diagram depicting an exemplary EHT cooperative multi-band operation applied to a preamble punctured PPDU according to embodiments of the present invention.

FIG. 12 is a transmission timing diagram 1200 depicting an exemplary EHT cooperative multi-band operation applied to a preamble punctured PPDU according to embodiments of the present invention. The cooperative multi-band operation requires station having simultaneous transmission and reception capability on different wireless band, for example, as depicted by exemplary multi-band cooperative STA 1155 in FIG. 11. Two transmitters on different bands perform independent Clear Channel Assessment (CCA); the transmissions can be joint or independent. Full duplex can be enabled by independent multi-band operation using FDD mode. Allocation information of one or more RUs addressed to a single STA can be encoded in EHT SIG-A fields 1220 and/or 1225, and EHT SIG-B fields 1230 and/or 1235. As depicted in FIG. 12, the EHT Preamble Punctured PPDU 1215 carries two PSDUs (PSDU1 1240 and PSDU2 1245) for STA1 in two RUs. Frequency segments (e.g., primary 80 MHz 1205 and secondary 80 MHz 1210) can be in the same band or in different bands.

Figure 13:
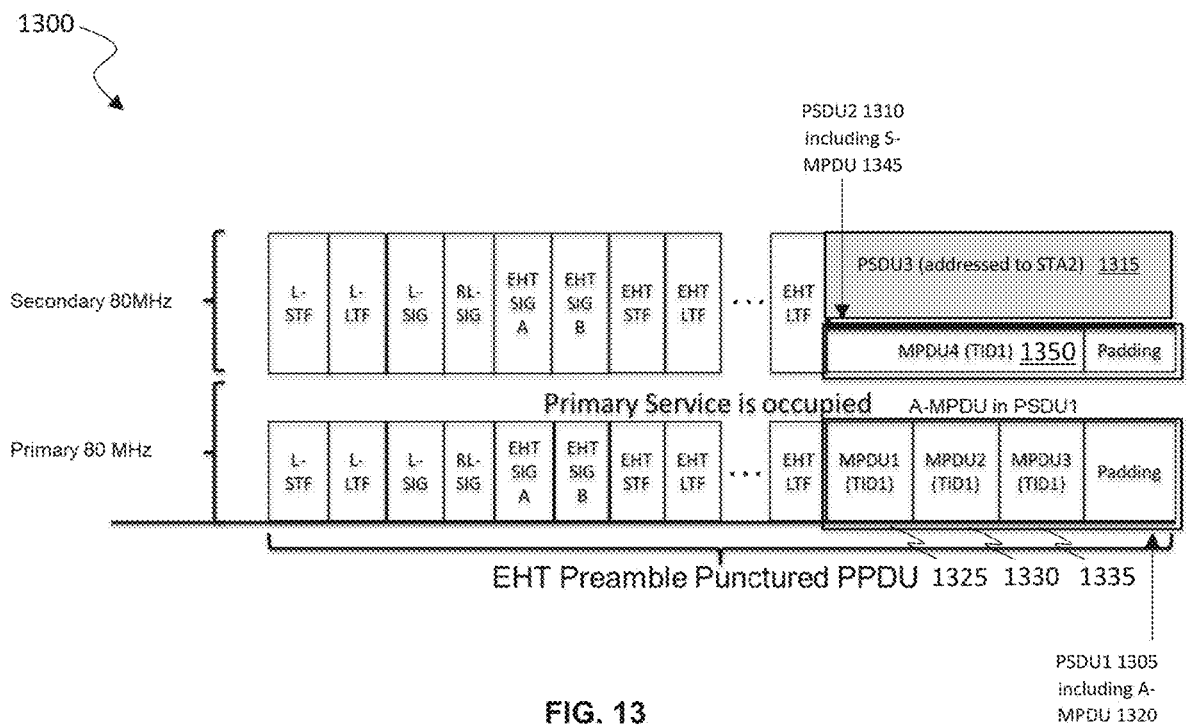
FIG. 13 is a transmission timing diagram depicting an exemplary EHT cooperative multi-band operation applied to a preamble punctured PPDU with each PSDU addressed to single STA according to embodiments of the present invention.

FIG. 13 is a transmission timing diagram 1300 depicting an exemplary EHT cooperative multi-band operation applied to a preamble punctured PPDU with each PSDU addressed to single STA according to embodiments of the present invention. In the EHT Preamble Punctured PPDU, PSDU1 1305 and PSDU2 1310 both have a MAC Protocol Data Unit (MPDU) (e.g., an Aggregate-MPDU or Single-MPDU) as depicted in FIG. 13. The A-MPDU 1320 sent on the primary 80 MHz channel includes MPDU1 (TID1) 1325, MPDU2 (TID1) 1330, MPDU3 (TID1) 1335, and padding. The S-MPDU 1345 sent on the secondary 80 MHz channel includes MPDU4 (TID1) 1350 and padding. A single sequence number space for MPDUs having the same TID (e.g., MPUD1 1325, MPDU2 1330, MPDU3 1335, and MPDU4 1350) is used for encoding the Sequence Number subfield value of the MPDUs transmitted in PSDUs.

Figure 14:
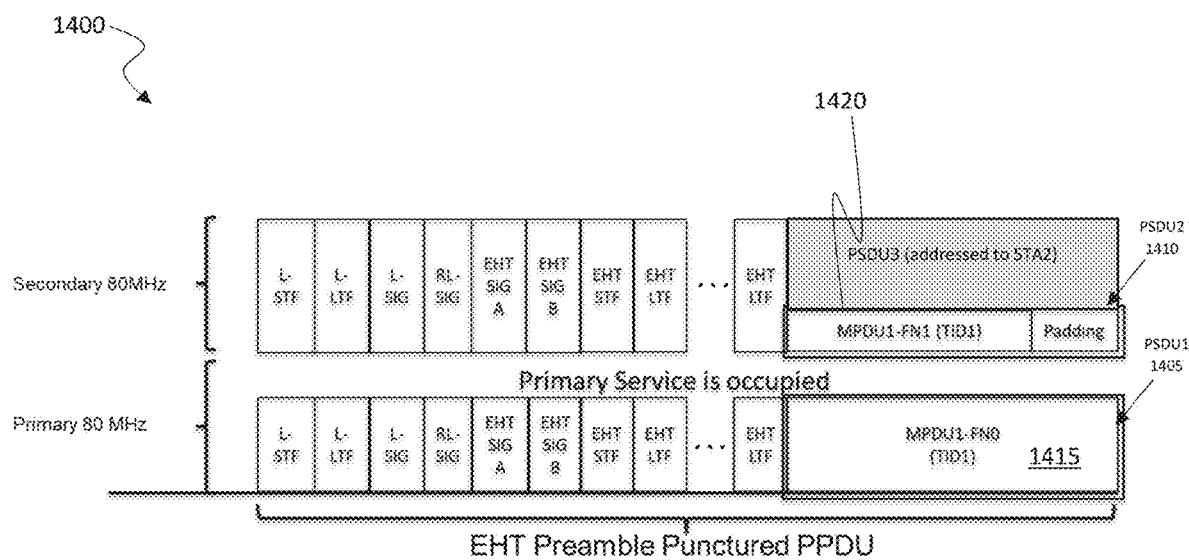
FIG. 14 is a transmission timing diagram depicting an exemplary EHT cooperative multi-band operation applied to a preamble punctured PPDU for transmitting an S-MPDU on multiple RUs and reducing the padding overhead according to embodiments of the present invention.

FIG. 14 is a transmission timing diagram 1400 depicting an exemplary EHT cooperative multi-band operation applied to a preamble punctured PPDU for transmitting an S-MPDU on multiple RUs and reducing the padding overhead according to embodiments of the present invention. As depicted in FIG. 14, dynamic fragmentation can be used to transmit an S-MPDU on multiple RUs and reduce padding overhead. Each PSDU (e.g., PSDU1 1405 and PSDU2 1410) addressed to single STA in the EHT Preamble Punctured PPDU is allocated one dynamic fragment of a MAC Service Data Unit (MSDU) (e.g., an Aggregate-MSDU or MMPDU) in an MPDU as shown in FIG. 14. For example, the Fragment Number (FN) 0 of the MSDU1 can be encapsulated in the MPDU1-FN0 1415 of the PSDU1 1405, and the Fragment Number (FN) 1 of the MSDU1 can be encapsulated in the MPDU1-FN1 1420 of the PSDU2 1410.

Figure 15:
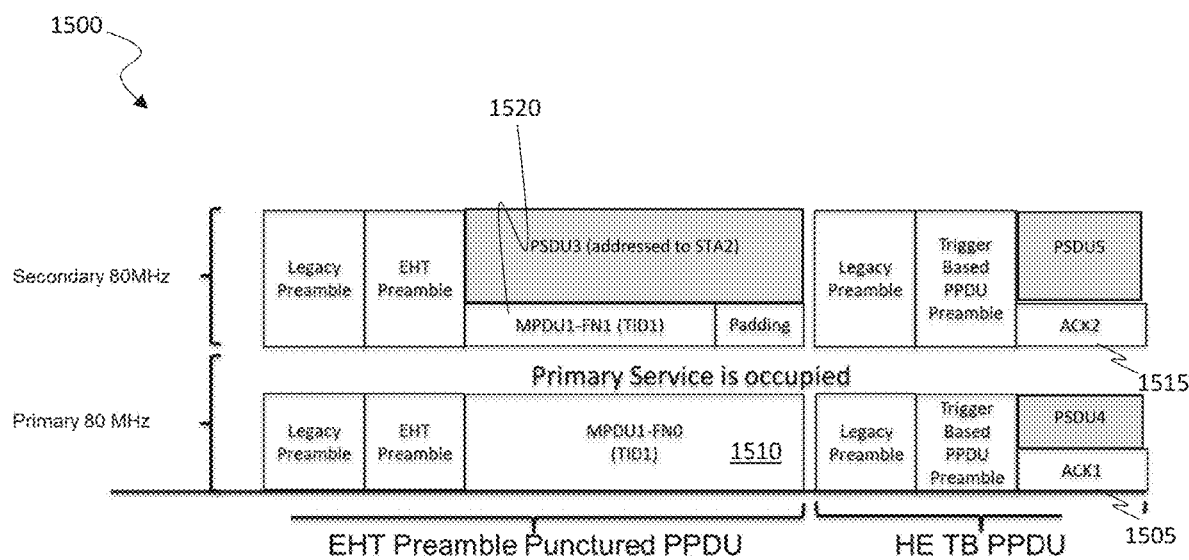
FIG. 15 is a transmission timing diagram depicting an exemplary EHT cooperative multi-band operation applied to a preamble punctured PPDU including an S-MPDU or A-MPDU addressed to single STA in the EHT Preamble Punctured PPDU soliciting an ACK frame according to embodiments of the present invention.

FIG. 15 is a transmission timing diagram 1500 depicting an exemplary EHT cooperative multi-band operation applied to a preamble punctured PPDU including an S-MPDU or A-MPDU addressed to single STA in the EHT Preamble Punctured PPDU soliciting an ACK frame according to embodiments of the present invention. When a frame of either an S-MPDU or A-MPDU of each PSDU addressed to single STA in the EHT Preamble Punctured PPDU solicits an ACK frame, the ACK response for the frame is sent on the same band, the same RU, and/or the same frequency segment on which the S-MPDU or A-MPDU is transmitted. The frame can be a (dynamic) fragment frame or a management frame. As depicted in FIG. 15, the ACK response (ACK1) 1505 for the frame MPDU1-FN0 1510 is sent on the same band, the same RU, and/or the same frequency segment on which the frame is transmitted, and the ACK response (ACK2) 1515 for the frame MPDU1-FN1 1520 is sent on the same band, the same RU, and/or the same frequency segment on which the frame is transmitted.

Figure 16:
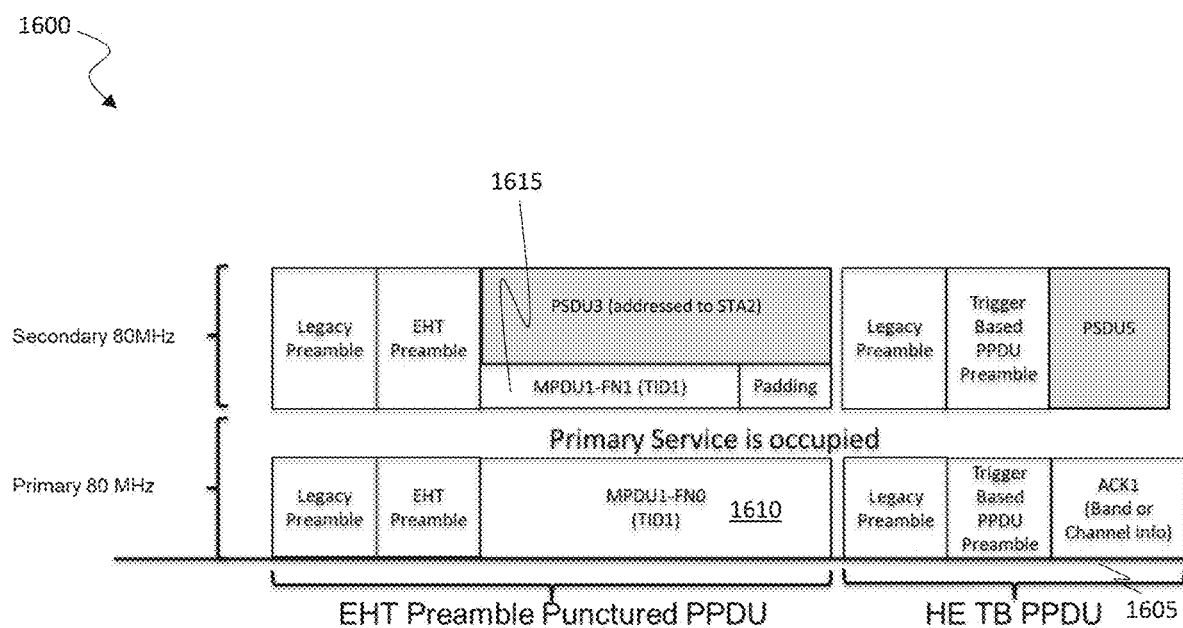
FIG. 16 is a transmission timing diagram depicting an exemplary EHT cooperative multi-band operation applied to a preamble punctured PPDU where a single ACK response can indicate the successful reception of multiple MPDU frames according to embodiments of the present invention.

Alternatively, as depicted in transmission timing diagram 1600 of FIG. 16, according to embodiments of the present invention, when a frame of either an S-MPDU or A-MPDU of each PSDU addressed to single STA in the EHT Preamble Punctured PPDU solicits an ACK frame, the ACK response for the frame can include the band or channel information indicating a band or channel on which the acknowledgement information is applied. In this case, as depicted in FIG. 16, a single ACK response (ACK1) 1605 can indicate the successful reception of both the MPDU1-FN0 frame 1610 and the MPDU1-FN1 frame 1615. Moreover, the same rule is applied when a non-AP STA sends more than one HE TB PPDUs on multiple RUs. When a frame of either an S-MPDU or A-MPDU of each PSDU of HE TB PPDUs sent from single STA solicits an ACK frame, the ACK response for the frame is sent on the same band, the same RU, and/or the same frequency segment on which the frame is originally transmitted. Alternatively, when a frame of either an S-MPDU or A-MPDU of each PSDU (e.g., PSDU1 and PSDU2) of HE TB PPDUs sent from single STA solicits an ACK frame, the ACK response for the frame can include the band or channel information indicating a band or channel on which the acknowledgement information is applied.

Figure 17A:
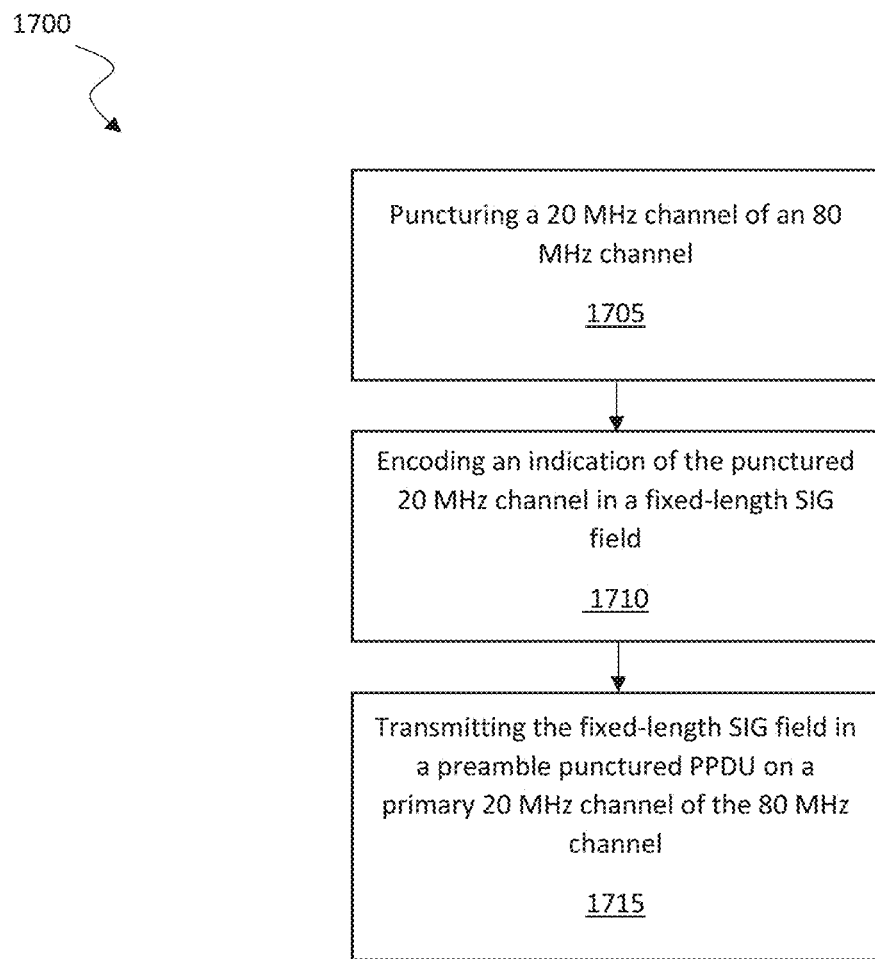
FIG. 17A is a flowchart depicting an exemplary sequence of computer implemented steps for performing wireless communication using a preamble punctured PDDU in an 80 MHz channel according to embodiments of the present invention.

With regard to FIG. 17A, an exemplary sequence of computer implemented steps 1700 for performing wireless communication using a preamble punctured PDDU in an 80 MHz channel is depicted according to embodiments of the present invention.

At step 1705, a 20 MHz channel of an 80 MHz channel is punctured.

At step 1710, an indication of the punctured 20 MHz channel is encoded in a fixed-length SIG field.

At step 1715, the fixed-length SIG field is transmitted in a preamble punctured PPDU on a primary 20 MHz channel of the 80 MHz channel.

Figure 17B:
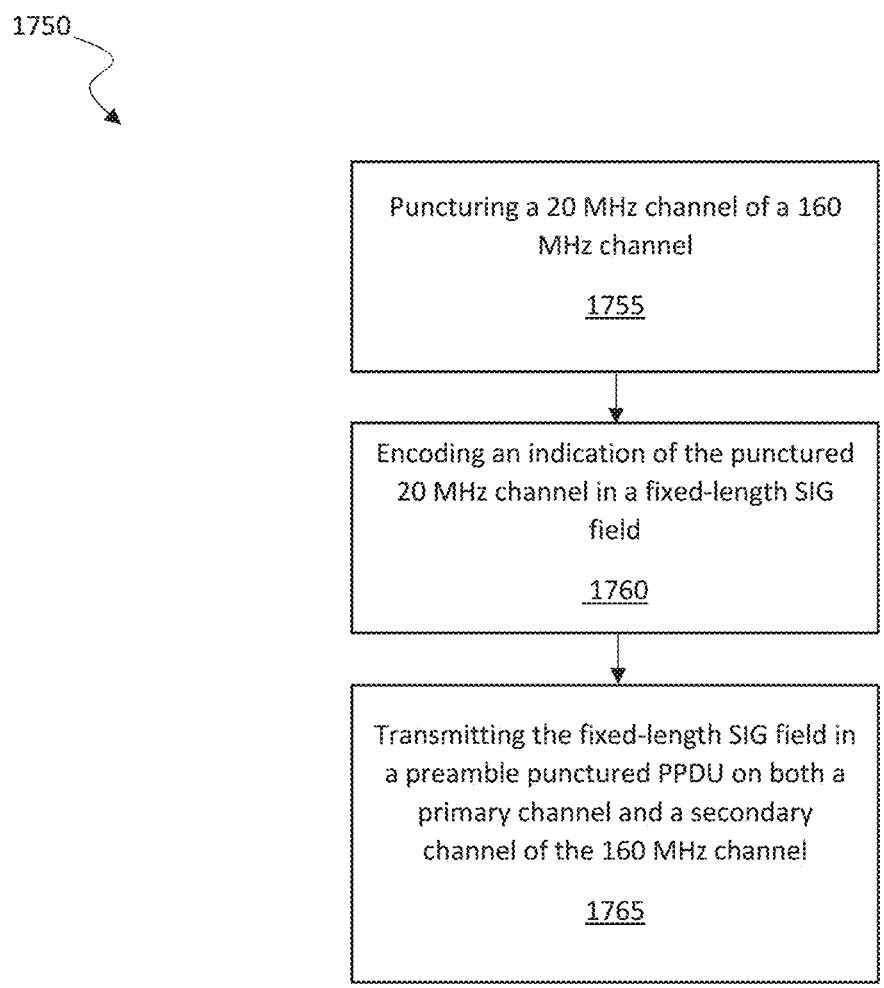
FIG. 17B is a flowchart depicting an exemplary sequence of computer implemented steps for performing wireless communication using a preamble punctured PDDU in a 160 MHz channel according to embodiments of the present invention.

With regard to FIG. 17B, an exemplary sequence of computer implemented steps 1750 for performing wireless communication using a preamble punctured PDDU in a 160 MHz channel is depicted according to embodiments of the present invention.

At step 1755, a 20 MHz channel of a 160 MHz channel is punctured.

At step 1760, an indication of the punctured 20 MHz channel is encoded in a fixed-length SIG field.

At step 1765, the fixed-length SIG field is transmitted in a preamble punctured PPDU on both a primary channel and a secondary channel of the 160 MHz channel.

Figure 18:
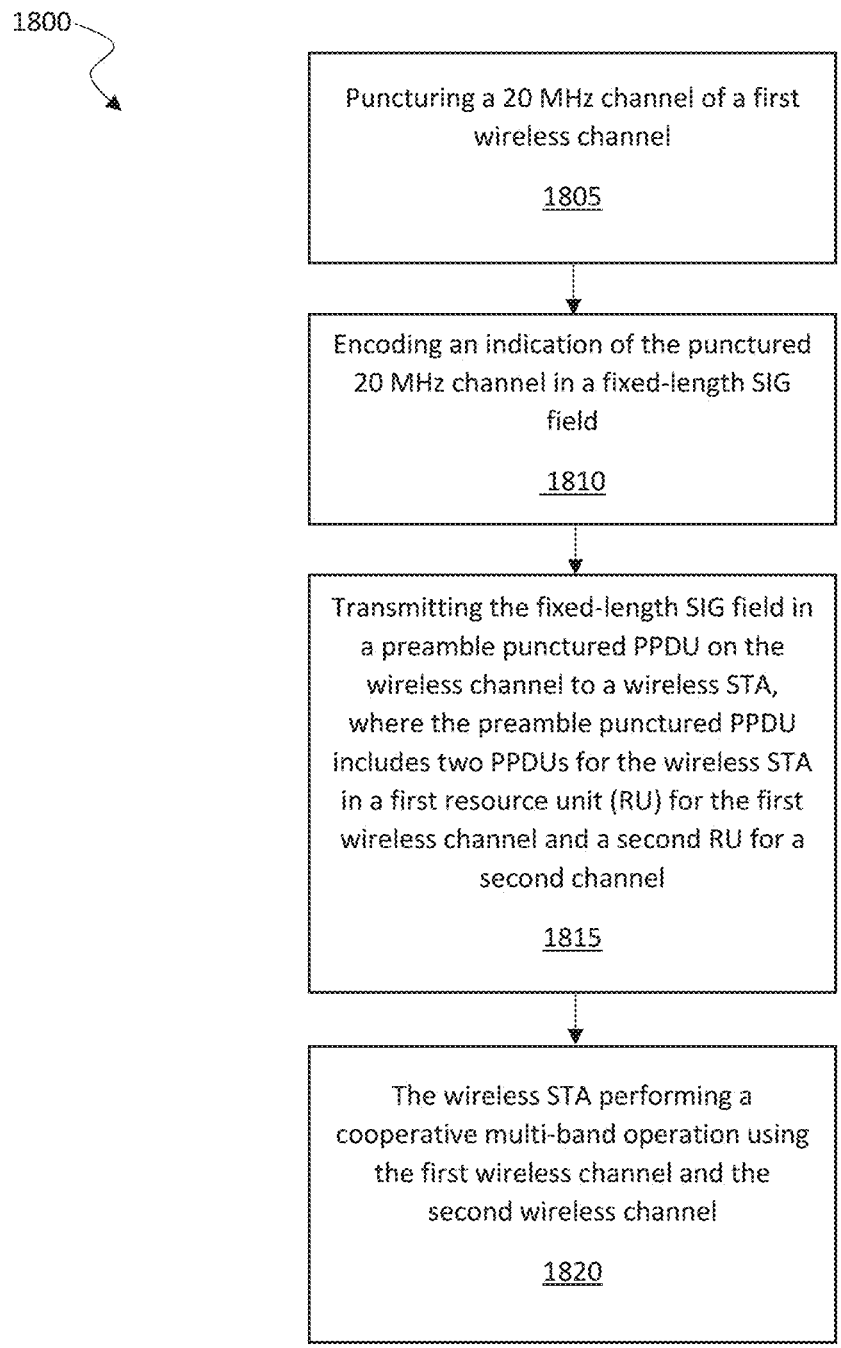
FIG. 18 is a flowchart depicting an exemplary sequence of computer implemented steps for performing wireless communication using a preamble punctured PDDU for coordinated multi-band operation according to embodiments of the present invention.

With regard to FIG. 18, an exemplary sequence of computer implemented steps 1800 for performing wireless communication using a preamble punctured PDDU for coordinated multi-band operation is depicted according to embodiments of the present invention.

At step 1805, a 20 MHz channel of a first wireless channel is punctured.

At step 1810, an indication of the punctured 20 MHz channel is encoded in a fixed-length SIG field.

At step 1815, the fixed-length SIG field is transmitted in a preamble punctured PPDU on the wireless channel to a wireless STA. The preamble punctured PPDU includes two PPDUs for the wireless STA in a first resource unit (RU) for the first wireless channel and a second RU for a second wireless channel. The wireless STA is configured for simultaneous data transmission and reception on the first wireless channel and the second wireless channel.

At step 1820, the wireless STA performs a cooperative multi-band operation using the first wireless channel and the second wireless channel simultaneously.

Exemplary Computer Controlled System

Embodiments of the present invention are drawn to electronic systems for a providing a punctured preamble PPDU enabling wireless devices to efficiently use a channel (e.g., an 80 or 160 MHz channel) where a primary service is operating. A Wideband Channel Access Mechanism for 20 MHz/80 MHz operating STAs is provided so that a 20 MHz/80 MHz operating STA can dynamically move to a secondary channel to improve wireless performance of the STA. An AP coordinates the operating channel switch of the 20 MHz/80 MHz operating STA. The following discussion describes one such exemplary electronic system or computer system can be used as a platform for implementing embodiments of the present invention.

Figure 19:
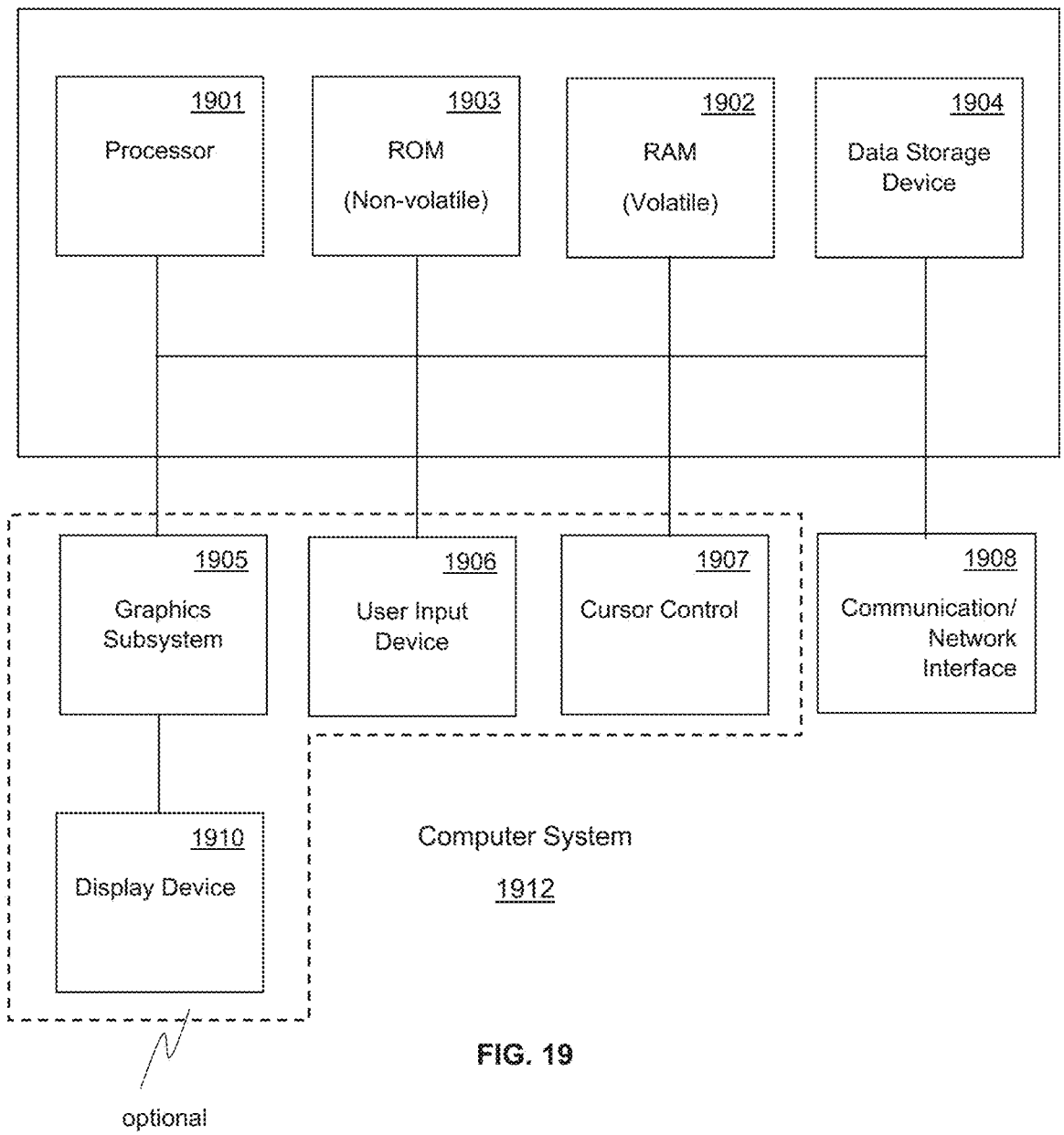
FIG. 19 is a block diagram of an exemplary computer system platform upon which embodiments of the present invention may be implemented.

In the example of FIG. 19, the exemplary computer system 1912 includes a central processing unit (CPU) or a processor 1901 for running software applications and optionally an operating system. According to some embodiments, the exemplary computer system 1912 is a multi-band cooperative wireless access point AP or a multi-band cooperative wireless station STA. Random access memory 1902 and read-only memory 1903 store applications and data for use by the CPU 1901. Data storage device 1904 provides non-volatile storage for applications and data and may include fixed disk drives, removable disk drives, flash memory devices, and CD-ROM, DVD-ROM or other optical storage devices. The optional user input device 1906 and cursor control 1907 comprise devices that communicate inputs from one or more users to the computer system 1912 (e.g., mice, joysticks, cameras, touch screens, and/or microphones).

A communication or network interface 1908 includes one or more transceivers and allows the computer system 1912 to communicate with other computer systems, networks, or devices via an electronic communications network, including wired and/or wireless communication and including an Intranet or the Internet (e.g., 802.19 wireless standard). The communication or network interface 1908 can transmit punctured preamble PPDUs enabling wireless devices to efficiently use a channel (e.g., an 80 or 160 MHz channel) where a primary service is operating. As depicted by multi-band cooperative AP 1105 and multi-band cooperative STA 1170 in FIG. 11, the computer system 1912 can include multiple transceivers (e.g., a 2.4 GHz transceiver, a 5 GHz transceiver, and/or a 6 GHz transceiver) for performing multi-band cooperative operation using multiple transceivers simultaneously.

The optional display device 1910 may be any device capable of displaying visual information in response to a signal from the computer system 1912 and may include a flat panel touch sensitive display, for example, and may be remotely disposed. The components of the computer system 1912, including the CPU 1901, memory 1902/1903, data storage 1904, user input devices 1906, and graphics subsystem 1905 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of wireless communication using a preamble punctured Physical Layer Convergence Protocol (PLCP) Protocol Data Unit (PPDU), the method comprising:
   puncturing a 20 MHz channel of an 80 MHz channel, wherein the punctured 20 MHz channel is operable to service a wireless device;
   encoding an indication of the punctured 20 MHz channel in a fixed-length SIG field; and
   transmitting the fixed-length SIG field in a preamble punctured PPDU on a primary 20 MHz channel of the 80 MHz channel.

2. The method as recited in claim 1, wherein the 80 MHz channel comprises the primary 20 MHz channel, a 20 MHz secondary channel, and a 40 MHz secondary channel, and wherein the puncturing comprises puncturing the 20 MHz secondary channel.

3. The method as recited in claim 2, wherein a bandwidth field of the preamble punctured PPDU comprises a value of 4.

4. The method as recited in claim 1, wherein the 80 MHz channel comprises the primary 20 MHz channel, a 20 MHz secondary channel, 40 MHz left secondary channel, and a 40 MHz right secondary channel, and wherein the puncturing comprises puncturing the 40 MHz left secondary channel.

5. The method as recited in claim 4, wherein a bandwidth field of the preamble punctured PPDU comprises a value of 5.

6. The method as recited in claim 1, further comprising performing an MU-RTS Trigger/CTS frame exchange.

7. The method as recited in claim 6, wherein performing an MU-RTS Trigger/CTS frame exchange comprises soliciting simultaneous CTS frame responses from a plurality of wireless STAs.

8. The method as recited in claim 7, wherein an MU-RTS Trigger frame of the MU-RTS Trigger/CTS frame exchange comprises a Disallowed Subchannel Bitmap in a User Info field indicating disallowed 20 MHz subchannels and disallowed 242-tone RUs.

9. The method as recited in claim 8, wherein an AID12 subfield of the MU-RTS Trigger frame is set to a value of 2047.

10. The method as recited in claim 1, wherein the primary 20 MHz channel is operable to service a basic service set (BSS), and wherein the punctured 20 MHz channel is further operable to service an overlapping BSS (OBSS).

11. A method of wireless communication using a preamble punctured Physical Layer Convergence Protocol (PLCP) Protocol Data Unit (PPDU), the method comprising:
puncturing a 20 MHz channel of a 160 MHz channel, wherein the punctured 20 MHz channel is operable to service a wireless device;
encoding an indication of the punctured 20 MHz channel in a fixed-length SIG field; and
transmitting the fixed-length SIG field in a preamble punctured PPDU on both a primary channel and a secondary channel of the 160 MHz channel.

12. The method as recited in claim 11, wherein the 160 MHz channel comprises an 80+80 MHz channel.

13. The method as recited in claim 11, wherein a bandwidth field of the preamble punctured PPDU comprises a value of 6 indicating that a secondary 20 MHz channel of a primary 80 MHz channel is punctured.

14. The method as recited in claim 11, wherein a bandwidth field of the preamble punctured PPDU comprises a value of 7 indicating that a primary 40 MHz channel of a primary 80 MHz channel is punctured.

15. The method as recited in claim 11, wherein one, two, or three 20 MHz channels of a secondary 80 MHz channel are punctured.

16. The method as recited in claim 11, wherein the primary channel and the secondary channel are operable to service a basic service set (BSS), and wherein the punctured 20 MHz channel is further operable to service an overlapping BSS (OBSS).

* * * * *